(12) United States Patent
Matsuura

(10) Patent No.: US 7,346,557 B2
(45) Date of Patent: Mar. 18, 2008

(54) INFORMATION PROCESSING APPARATUS AND INFORMATION PROCESSING METHOD

(75) Inventor: Kenichiro Matsuura, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 490 days.

(21) Appl. No.: 10/848,163

(22) Filed: May 19, 2004

(65) Prior Publication Data

US 2005/0004847 A1 Jan. 6, 2005

(30) Foreign Application Priority Data

May 20, 2003 (JP) .............................. 2003-142407

(51) Int. Cl.
*G06Q 30/00* (2006.01)
*G06F 17/30* (2006.01)
(52) U.S. Cl. ........................................ 705/26; 705/27
(58) Field of Classification Search .................. 705/26, 705/27
See application file for complete search history.

(56) References Cited

U.S. PATENT DOCUMENTS 6,237,035 B1 * 5/2001 Himmel et al. ............. 709/224
7,003,494 B2 * 2/2006 Beach et al. ................. 705/40
7,110,969 B1 * 9/2006 Bennett et al. .............. 705/35
2002/0143655 A1 * 10/2002 Elston et al. ................. 705/26
2004/0002886 A1 * 1/2004 Dickerson et al. ............ 705/9
2004/0002918 A1 * 1/2004 McCarthy et al. ........... 705/40

OTHER PUBLICATIONS

Anonymous, "Technology User Report," United States Banker, New York, Jan. 1983, vol. 94, iss. 1, p. 56.*

* cited by examiner

*Primary Examiner*—Yogesh C. Garg
*Assistant Examiner*—Amee A. Shah
(74) *Attorney, Agent, or Firm*—Fitzpatrick, Cella, Harper & Scinto

(57) ABSTRACT

An information processing apparatus stores a plurality of item codes in a storage unit, each of which is associated with an item type. The apparatus accepts a new order, which includes an item code and a user ID, from a customer terminal. The apparatus then searches for an item type stored in the storage unit based on the item code included in the new order, and checks whether or not the new order is a duplicate based on the item code and the user ID included in the new order. The apparatus notifies the customer terminal of the checking result, where check is controlled so as to check or not to check a new order based on the item type associated with the order.

5 Claims, 21 Drawing Sheets

| APPLICATION OF ITEM/SERVICE |
|---|

U0101

DO YOU WANT TO APPLY FOR THIS ITEM/SERVICE?

APPLY

| INPUT ORDERER INFORMATION |

PLEASE INPUT ORDERER INFORMATION

NAME  FAMILY NAME [U0201]  FIRST NAME [U0202]
U0203
ADDRESS  POSTAL CODE [ ] — [ ] ~U0204
PREFECTURE  [HOKKAIDO ▽] ~U0205
LOCAL ADDRESS
[ ] ~U0206
TELEPHONE [ ] — [ ] — [ ] ~U0209
MAIL [ ] ~U0210
U0207  U0208

PAYMENT METHOD  ◉ xxx CREDIT        ○ CONVENIENCE STORE YYY
                U0211                 U0212

U0220 —[ CANCEL ]    [ OK ]— U0221

| INPUT ORDERER/DELIVERY ADDRESS INFORMATION |

PLEASE INPUT ORDERER/
DELIVERY ADDRESS INFORMATION IF DELIVERY ADDRESS
IS DIFFERENT FROM THAT OF ORDERER

ORDERER U0301 U0303
NAME  FAMILY NAME [ ]    FIRST NAME [ ] ~U0302
ADDRESS  POSTAL CODE [ ] — [ ] ~U0304
PREFECTURE  [HOKKAIDO ▽] ~U0305

LOCAL ADDRESS
[                                    ] ~U0306
TELEPHONE [ ] — [ ] — [ ] ~U0309
MAIL [                                ] ~U0310
U0307   U0308

DELIVERY U0320 U0322
NAME  FAMILY NAME [ ]    FIRST NAME [ ] ~U0321
ADDRESS  POSTAL CODE [ ] — [ ] ~U0323
PREFECTURE  [HOKKAIDO ▽] ~U0324

LOCAL ADDRESS
[                                    ] ~U0325
TELEPHONE [ ] — [ ] — [ ] ~U0328
MAIL [                                ] ~U0329
U0326   U0327

PAYMENT METHOD  ⊙ xxx CREDIT    ○ CONVENIENCE STORE YYY
U0330                U0331

U0340 ~[ CANCEL ]    [ OK ] ~U0341

FIG. 5

| PLEASE INPUT CARD NUMBER AND EXPIRATION DATE | U0400 |

PLEASE INPUT CARD NUMBER AND EXPIRATION DATE

CARD NUMBER [_____] ~U0401

EXPIRATION DATE [____] YEAR   [____] MONTH
                  U0402           U0403

| ORDER RESULT |

U0501

ORDER IS SUCCESSFUL

ORDER NUMBER : 1111

| ORDER RESULT |

U0601

ANOTHER VALID ORDER IS FOUND

ORDER NUMBER : 1111

U0602

| ORDER AGAIN | QUIT ORDER |
| U0611 | U0610 |

| ORDER LIST |
|---|

ORDER NUMBER

1107 ~ U0701

1108

1109

1110

1111

1112

1113

1114

1115

1116

1117

| PREVIOUS PAGE | NEXT PAGE |
|---|---|
| U0710 | U0711 |

FIG. 9

ORDER INFORMATION DETAILS — U0800

[RESTART ORDER PROCESS] U0810      [BACK] U0811

- U0801 — ITEM NAME : AIU
- U0802 — STATUS : c08

U0803 — ORDERER
- NAME : TARO GANON
- ADDRESS : 〒146-8501
- 3-30-2, SIMOMARUKO, OTA-KU, TOKYO
- TELEPHONE : 03-3758-2111
- MAIL : xxx@eanon.co.jp U0804 — DELIVERY
- NAME : TARO GANON
- ADDRESS : 〒146-8501
- 3-30-2, SIMOMARUKO, OTA-KU, TOKYO
- TELEPHONE : 03-3758-2111
- MAIL : xxx@eanon.co.jp

- U0805 — PAYMENT METHOD : xxx CREDIT
- U0806 — CREATION DATE : APRIL 10, 2003, 17 : 33

| ORDER INFORMATION | |
|---|---|
| ORDER NUMBER | ～T0101 |
| ITEM CODE | ～T0102 |
| ITEM TYPE | ～T0103 |
| STATUS | ～T0104 |
| CREATION DATE | ～T0105 |
| PAYMENT METHOD | ～T0106 |
| PAYMENT DUE | ～T0107 |
| PAYMENT RESULT | ～T0108 |
| USER ID | ～T0109 |
| QUANTITY | ～T0110 |
| PRICE | ～T0111 |

| USER INFORMATION | |
|---|---|
| USER ID | T0201 |
| FAMILY NAME | T0202 |
| FIRST NAME | T0203 |
| POSTAL CODE (UPPER) | T0204 |
| POSTAL CODE (LOWER) | T0205 |
| PREFECTURE CODE | T0206 |
| ADDRESS | T0207 |
| AREA CODE | T0208 |
| LOCAL OFFICE NUMBER | T0209 |
| TELEPHONE NUMBER | T0210 |
| MAIL ADDRESS | T0211 |

| ORDERER INFORMATION | |
|---|---|
| ORDER NUMBER | ~ T0301 |
| FAMILY NAME (ORDERER) | ~ T0302 |
| FIRST NAME (ORDERER) | ~ T0303 |
| POSTAL CODE (UPPER) | ~ T0304 |
| POSTAL CODE (LOWER) | ~ T0305 |
| PREFECTURE CODE | ~ T0306 |
| ADDRESS | ~ T0307 |
| AREA CODE | ~ T0308 |
| LOCAL OFFICE NUMBER | ~ T0309 |
| TELEPHONE NUMBER | ~ T0310 |
| MAIL ADDRESS | ~ T0311 |

| USER INFORMATION |
|---|
| ORDER NUMBER — T0401 |
| FAMILY NAME (DELIVERY) — T0402 |
| FIRST NAME (DELIVERY) — T0403 |
| POSTAL CODE (UPPER) — T0404 |
| POSTAL CODE (LOWER) — T0405 |
| PREFECTURE CODE — T0406 |
| ADDRESS — T0407 |
| AREA CODE — T0408 |
| LOCAL OFFICE NUMBER — T0409 |
| TELEPHONE NUMBER — T0410 |
| MAIL ADDRESS — T0411 |

INFORMATION PROCESSING APPARATUS AND INFORMATION PROCESSING METHOD

FIELD OF THE INVENTION

The present invention relates to an information processing apparatus, an information processing method, a program for implementing that method, and a storage medium which computer-readably stores the program and, more particularly, to an apparatus and the like which receives orders from customers via a network without receiving any duplicate orders.

BACKGROUND OF THE INVENTION

In recent years, along with the development of communication infrastructures and progress of information communication technologies, users who browse WEB pages can order merchandise and services via the Internet. As various payment methods of such commercial transactions via the Internet are available, (e.g., credit card payment, convenience store payment, e-cash) a single sales site often supports a plurality of payment methods.

Some payment service providers who provide such payment means provide WEB pages that accept payments. The user who wants to order merchandise or service can directly notify a payment service provider of payment information using such WEB page that accepts payment, and need not inform sellers of merchandizes and services of his or her payment information.

Conventionally, it is a common practice that a seller of merchandizes and services accepts payment information, and notifies a payment service provider of that information. However, WEB pages provided by payment service providers are recently prevalently applied since purchasers' payment information is unlikely to be leaked to a third party, and sellers are unlikely to be held responsible for such leakage.

A payment procedure using a WEB page provided by a payment service provider normally requires the following steps. A WEB page that exhibits available items and services is displayed first, and a WEB page that prompts an orderer to input his or her name and the like is displayed. When the orderer presses, for example, a payment button, a WEB page provided by the payment service provider is displayed, and information about the amounts of merchandizes and services, which is required for a payment, is passed from the seller to the payment service provider at that time. The orderer inputs information required for a payment such as a credit card number and the like on the WEB page provided by the settlement service provider. If the settlement service provider certifies the payment based on the input information, the settlement service provider notifies the seller whether or not the payment procedure is normally completed, and the seller then displays a WEB page which includes the payment result, order contents, and the like.

On the other hand, when a WEB page provided by the settlement service provider is not applied, the following steps are commonly used. A WEB page that exhibits items and services available at the seller's WEB site is displayed first, and a WEB page that prompts an orderer to input information required for a payment (e.g., a credit card number and the like) together with his or her name and the like is displayed. When the orderer presses, for example, a payment button, the seller passes information such as the amount, credit card number, and the like to the payment service provider. The payment service provider notifies the seller, based on the input information, whether or not the payment procedure is normally completed, and the seller then displays a WEB page which includes the payment result, order contents, and the like.

In this manner, in commercial transactions using the Internet, information exchange via the network includes an item specifying step, an orderer specifying step, a payment method specifying & application step, and the like. For this reason, processes cannot be completed in the middle of a transaction, and the orderer may inadvertently make a plurality of identical applications although he or she actually wanted to make a single application. When the WEB page provided by the payment service provider is used, because information exchange with another site other than the seller is required for the orderer, such problem is more likely to occur.

This problem is posed upon selling tangible items. Also, when provision of a specific service for a predetermined period is to be charged, because an identical orderer may be inhibited from making an application of identical contents, the above problem becomes more serious.

As described above, because a single sales site often supports a plurality of payment methods, a single user may make a payment using different payment systems (payment service providers) upon ordering an identical item. For this reason, when the identical orderer is inhibited from making an application of identical contents, different payment systems may be designated even for orders with identical contents.

SUMMARY OF THE INVENTION

The present invention has been made in consideration of the aforementioned prior arts, and has as its object to provide an information processing apparatus and the like, which checks the presence/absence of duplicate orders in on-line sales, notifies an orderer that duplicate orders are inhibited or a duplicate order has already been placed, improves the productivity of a site manager by solving management problems such as refund and the like, which occur upon suppressing duplicate orders, and prevents management errors.

In order to achieve the above object, the present invention has the following arrangement.

(1) An information processing apparatus comprises:

order acceptance means for accepting an order from a customer;

duplicate order checking means for checking if the customer has placed an order of an identical type in addition to the order;

order acceptance notifying means for controlling to notify the customer of the checking result of the duplicate order checking means; and information holding means for holding information of an order which is determined to be acceptable.

(2) More preferably, the apparatus further comprises:

payment information providing means for providing information to an external payment system; and payment information acceptance means for accepting information from the external payment system, and the order acceptance notifying means further controls to notify the customer of acceptability of the order, on the basis of the information received from the payment information acceptance means, and the information holding means further holds the external payment information.

Other features and advantages of the present invention will be apparent from the following description taken in

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 shows a merchandise & service application start window;

FIG. 3 shows a window used to input orderer information upon making an application for an item or service;

FIG. 4 shows a window used to input information about an orderer and delivery address upon making an application for an item or service;

FIG. 5 shows an input window of a credit card number and expiration date, which is provided by a credit card company, upon making an application for an item or service;

FIG. 6 shows a window used to display an order result upon making an application for an item or service;

FIG. 7 shows a window used to display the presence of duplicate orders upon making an application for an item or service;

FIG. 8 shows a window used to display a list of received orders for a system administrator;

FIG. 9 shows a window used to display detailed information of each received order for the system administrator;

FIG. 11 shows an example of the data configuration of a table that stores order information;

FIG. 12 shows an example of the data configuration of a table that stores information of a registered customer;

FIG. 13 shows an example of the data configuration of a table that stores orderer information;

FIG. 14 shows an example of the data configuration of a table that stores delivery address information;

DETAILED DESCRIPTION OF THE PREFERRED EMBODIMENTS

Preferred embodiments of the present invention will be described in detail hereinafter with reference to the accompanying drawings. Note that the relative layout of building components, display dialogs, and the like described in the embodiments do not limit the scope of the present invention to only themselves unless otherwise specified. The present invention also includes inventions which can solve common problems in services that exploit a network.

<Arrangement of Information Processing System of This Embodiment>

An object of this embodiment is to provide an information processing system, which refuses an application of an identical item/service and solves management problems such as refund and the like which occur upon inhibiting duplicate orders, when a plurality of applications of that item/service from an identical customer are to be inhibited under a specific condition upon accepting an application of the item/service from the customer via a network. A case will be explained below wherein an item/service is to be sold as an embodiment of the present invention.

<Definition of Terms>

Some terms used in this specification will be defined.

(1) "Order": To proceed with a purchase procedure of a merchandise or service using a sales system of this embodiment so as to purchase that item or service, and that procedure itself. In order to identify its procedure, "order procedure" is used.

(2) "Duplicate purchase": To purchase a plurality of identical items or the like by a single customer.

(3) "Duplicate order": Orders that result in duplicate purchase.

(4) "Non-duplicate item": An item that does not allow duplicate purchases and an item that inhibits duplicate purchases.

(5) "Limited-duplicate item: An item, duplicate purchase of which results in an orderer's disbenefit, and an item which requires orderer's confirmation about duplicate purchases for an orderer's benefit upon ordering.

(6) "Unlimited item": An item, which does not inhibit duplicate purchases, and does not bring about any orderer's disbenefit due to duplicate purchases.

Figure 1:
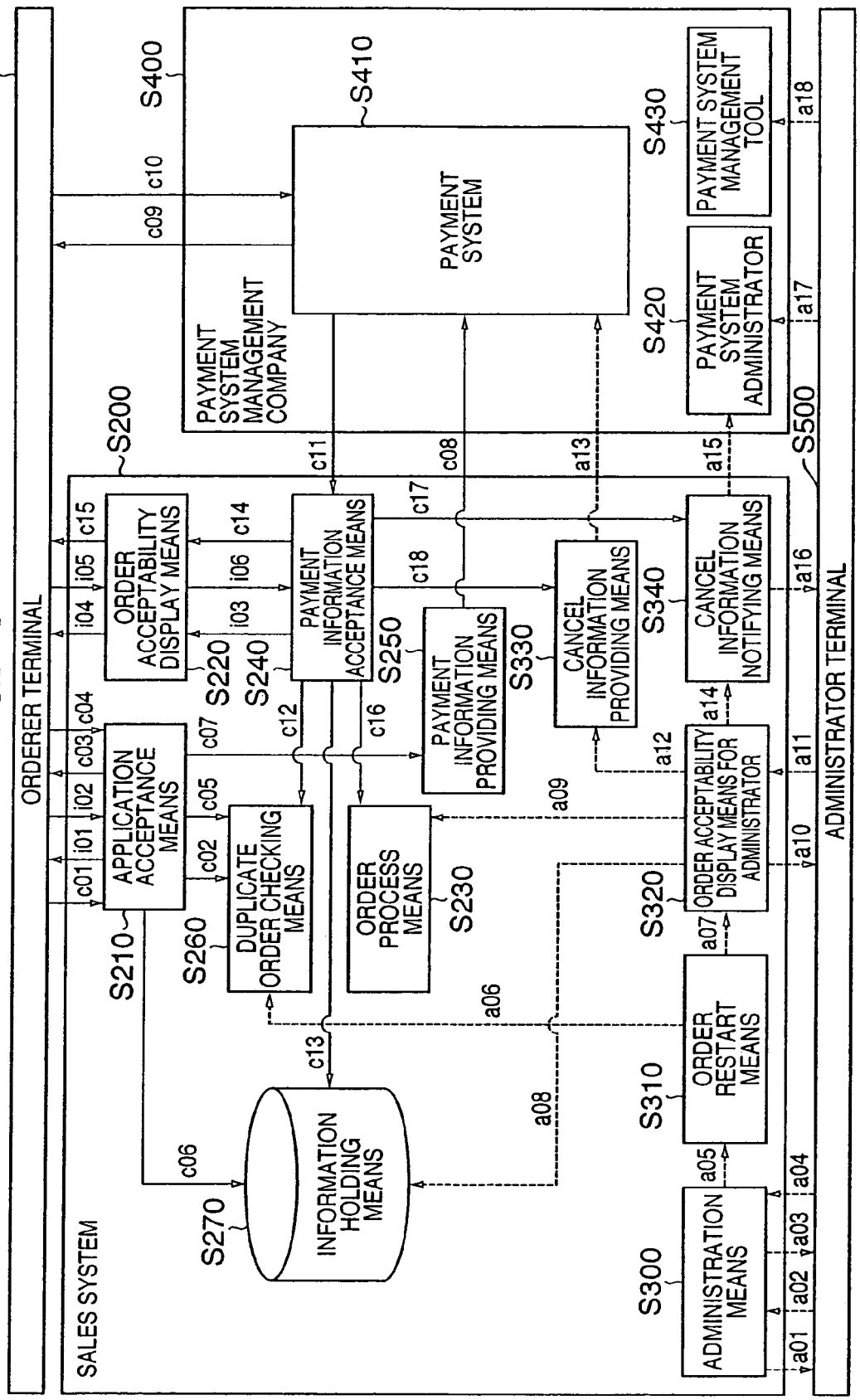
FIG. 1 is a schematic block diagram showing the arrangement of a system according to an embodiment of the present invention.

FIG. 1 shows the arrangement of an overall system S200 (to be referred to as a sales system hereinafter) which is used to provide services of this embodiment, and the relationship and information exchange among an administrator terminal S500 for an administrator who administrates the sales system S200, an orderer terminal S100 used by an orderer as a customer of the sales system S200, and a management company S400 of a payment system which is used by the orderer to make a payment to the sales system S200.

Note that FIG. 1 does not cover all of information and messages (requests, responses, and the like) to be exchanged of respective processors. A read process from an information holding means S270 will be omitted for the sake of simplicity, and only principal ones of update processes of databases stored in that means will be explained.

In FIG. 1, a payment system management company comprises a payment system S410, payment system administrator S420, and payment system management tool S430, but the payment system management tool S430 is not indispensable. The payment system management tool S430 displays the states of payments made in the payment system S410 for a predetermined period (e.g., one day) in accordance with order numbers to be described later. As information be displayed, payment-completed order numbers alone may be saved, or payment-completed order numbers and interrupted order numbers may be saved. In either case, the payment system tool S430 displays information which is to be referred to so as to check whether or not a payment of even a sales contract, which is not concluded in the sales system S200, is made. This information is provided by the payment system S410.

FIG. 1 illustrates only one payment system management company S400 for the sake of simplicity. However, a plurality of payment system management companies S400 may be present. The following explanation will be given under the condition that there are two payment system management companies S400. That is, FIG. 1 shows one of the two payment system management companies S400. Even when an actual company manages two or more payment systems, they can be equated with two or more payment system management companies S400. That is, the payment system management company S400 does not indicate a single, practical company, but is a concept that includes a single payment system S410, the payment system administrator S420 as its administrator, and the payment system management tool S430 as its management tool.

Furthermore, FIG. 1 illustrates the payment system management company S400 as if it were present outside the sales system S200. However, such illustration does not intend to exclude a single site that includes a sales system S200, payment system S410, and payment system management tool S430. Data used by the payment system S410 and payment system management tool S430 can be present on the information holding means S270.

Note that this embodiment is premised on that a payment can be canceled by an arbitrary method in a payment method such as credit card payment, which has no concept of payment reservation, and can complete a payment without requiring any cash payment. That is, a payment can be canceled by one of the payment system S410, payment system management tool S430, and payment system administrator S420.

The orderer terminal S100 in FIG. 1 is a terminal device such as a computer or the like, which is used by the orderer. The orderer computer can communicate with the sales system S200 and payment system S400. More specifically, the orderer terminal S100 is installed with, for example, a TCP/IP protocol stack and HTTP client program (WEB browser), and uses that WEB browser as a user interface with the orderer. The WEB browser on the orderer terminal S100 often relays information between the sales system S200 and payment system S410.

The administrator terminal S500 is a terminal device such as a computer or the like, which is used by the administrator, like in the orderer terminal S100. The administrator terminal S500 may have an arrangement that includes some means (administration means S300, order restart means S310, order acceptability display means S320 for the administrator, cancel information providing means S330, and cancel information notifying means S340) of the sales system S200. In this case, the administrator terminal S500 forms a part of the sales system S200. Furthermore, the administrator terminal S500 need not always be implemented by an independent computer, and can be implemented by a server computer which belongs to the sales system S200. However, in the description of this embodiment, the administrator accesses the sales system S200 via the administrator terminal S500.

Arrows in FIG. 1 indicate information exchange among the orderer terminal S100, sales system S200, payment system management company S400, administrator terminal S500.

As shown in FIG. 1, the sales system S200 comprises an application acceptance means S210, order acceptability display means S220, order process means S230, payment information acceptance means S240, payment information providing means S250, duplicate order checking means S260, information holding means S270, administration means S300, order restart means S310, order acceptability display means S320 for the administrator, cancel information providing means S330, and cancel information notifying means S340.

The respective means in the sales system S200 are implemented by programs stored on a memory on a server system including the sales system S200. This embodiment is an example that makes communications via the Internet, and the server system is implemented by computers which are connected via a network such as Ethernet® or the like. The respective means in the sales system S200 exchange information among them via this network if they are implemented on different computers, or as inter-process communications via a memory, disk, and the like on a computer if they are implemented on a single computer. The respective means in the sales system S200 can include an HTTP server and a lower-order network protocol server as their concepts, but an HTTP server and a lower-order network protocol server of the server system may be used. The information holding means S270 holds a database to be described later, and executes a data search process, update process, and the like according to requests. As the database, a relational database is used in this embodiment. However, the present invention is not limited to the relational database. The information holding means S270 saves data on a randomly accessible large-capacity storage medium such as a magnetic disk and the like. The disk may be either a disk on the server including the information holding means S270, or a disk on another server present on the network. Note that the respective means in the sales system S200 may be present on either physically different servers or a single server.

The order process means S230 takes different actions depending on items/services ordered via the orderer terminal S100. When an item ordered via the orderer terminal S100 is to be directly handled by a trader who manages the sales system S200, the order process means S230 displays a mail message to be sent to a person in charge, tools used by the person in charge, and the like. When an item ordered via the orderer terminal S100 is to be handled by a third party, the order process means S230 sends a FAX or mail message to the third party, or transmits data required for the third party to prepare for that item. Furthermore, when a service ordered via the orderer terminal S100 is handled on the site including the sales system S200, the order process means S230 executes a process for enabling the orderer terminal S100 to use that service. Because this embodiment is not designed to a specific item or service, the order process means S230 is not particularly limited.

<Access from Orderer to This Embodiment>

The behavior when the orderer accesses the system of this embodiment will be described below. FIGS. 2 to 7 respectively show an application window U0100, orderer information input window U0200, delivery address information input window U0300, credit information input window U0400, order result display window (1) U0500, and order result display window (2) U0600, which are displayed on a display of the orderer terminal S100 used by the orderer. The orderer purchases an item/service by acquiring information from or inputting information to the sales system S200 and payment system S410 via the windows U0100, U0200, U0300, U0400, U0500, and U0600 which are provided by the sales system S200 and payment system S410 and are displayed on the display of the orderer terminal S100.

The arrows in FIG. 1 indicate the flow of information (transmission/reception of commands such as requests, responses, and the like, data attached to them, and the like). In addition, in the following description, the steps of operations and processes which trigger to generate information flows are indicated by reference numbers assigned to the information flows invoked by them. For example, a description "press an application button U0110 (FIG. 1: step c01)" means depression of a software button displayed on the window of the orderer terminal S100 by the orderer, and indicates that the flow of predetermined information or the like to be passed from the orderer terminal S100 to the server computer of the sales system S200 is generated in step c01 in FIG. 1.

Note that the following description will explain how to operate the whole system including the operator. The operation of the server computer in the sales system and, especially, the structures and contents of data to be accessed, processing sequences, the contents of information exchanged among respective program modules (means in FIG. 1), and the like will be described in detail later with reference to the flowcharts in FIGS. 17A and 17B and subsequent figures.

FIG. 2 shows the application window U0100 used to start the item/service application operation. An application message U0101 is displayed in one line for the sake of simplicity, but various other messages such as comments of items/services may also be displayed. An apply button U0110 is used to make an application for an item/service, and two or more buttons may be displayed on this window.

The orderer accesses an HTTP server provided by, for example, the sales system S200 to display an order acceptance window of items and the like on the window by operating the orderer terminal S100, and inputs an order placement instruction after he or she selects items, quantities, and the like displayed on that window. In response to this instruction, the window in FIG. 2 is displayed on the orderer terminal S100.

When the orderer presses the apply button U0110 in FIG. 2 (FIG. 1: step c01), it is checked if an already valid order which overlaps the order of interest has been placed (FIG. 1: step c02). If the already valid order which overlaps the order of interest has been placed, the order result display window U0600 shown in FIG. 7 is displayed on the screen of the orderer terminal S100 (FIG. 1: step i01). Whether or not an already valid order is present is checked for an item or service, which inhibits multiple purchases by a single orderer (i.e., non-duplicate item), and a service, multiple contracts of which result in disbenefit for a single orderer (i.e., limited-duplicate item), an item, multiple purchases of which result in disbenefit, and the like.

If a duplicate order of a non-duplicate item is detected, no confirmation button U0611 is displayed on the order result display window U0600. The duplicate order is determined based on an order information table stored in the database of the information holding means S270. A detailed data structure and processing sequence will be described later. Note that an item which appears in the following description includes a service.

On the other hand, if it is determined that the duplicate purchase results in disbenefit for the orderer, or that confirmation is required for the orderer's benefit (i.e., if it is determined that the duplicate order of the limited-duplicate item is detected), the order result display window U0600 including the confirmation button U0611 is displayed on the orderer terminal S100. If an unlimited item which does not inhibit duplicate purchase, and does not bring about any orderer's disbenefit, is ordered, the duplicate order check process in step c02 itself is skipped. If the orderer presses the confirmation button U0611 (FIG. 1: step i02) while the order result display window U0600 including the confirmation button U0611 is displayed, the window U0200 shown in FIG. 3 or the window U0300 shown in FIG. 4 is displayed (FIG. 1: step c03). If no delivery address is required, the orderer information input window U0200 is displayed; if the delivery address is required, the delivery address information input window U0300 is displayed.

If the orderer presses the apply button U0110 on the application window U0100 for an unlimited item (FIG. 1: step c01), the orderer information input window U0200 shown in FIG. 3 or the window U0300 shown in FIG. 4 is displayed (FIG. 1: step c03).

The orderer enters his or her information in input columns U0201 to U02010 or input fields U0301 to U0310 and input fields U0320 to U0329. Furthermore, the orderer selects one of radio buttons U0211 and U0212 or one of radio buttons U0330 and U0331 as a payment method. In this embodiment, two choices are available as the payment method. However, the number of payment methods is not limited to two. Upon depression of a cancel button U0220 or U0340, the application window U0100 is displayed to interrupt the item/service application operation.

If the orderer presses an OK button U0221 on the window U0200 or an OK button U0341 on the window U0300 (FIG. 1: step c04), the sales system S200 checks if the orderer of interest has already placed a valid order for the item of interest (FIG. 1: step c05). More specifically, it is checked if the current order generates duplicate orders. If the item to be ordered is an unlimited item, step c05 is skipped. If the already valid order of the item of interest is present, the order result display window U0600 shown in FIG. 7 is displayed (FIG. 1: step i01). The presence/absence of duplicate orders is checked for a non-duplicate item or limited duplicate item, but is not checked for an unlimited item.

If it is determined that a duplicate order of a non-duplicate item is placed, no confirmation button U0611 appears on the order result display window U0600.

If a duplicate order of a limited-duplicate item is placed, the order result display window U0600 including the confirmation button U0611 is displayed on the orderer terminal S100.

As for an unlimited item, the duplicate order check process in step c05 itself is skipped. Also, even when a limited-duplicate item is ordered, if the confirmation button U0611 has been pressed in step c02, the duplicate order check process in step c05 itself is skipped.

If the orderer presses the confirmation button U0611 (FIG. 1: step i02) while the order result display window U0600 including the confirmation button U0611 is displayed, information required for a payment is passed to a payment system (i.e., the payment system S410 in this embodiment) which is selected by the radio button U0211 or U0212 or the radio button U0330 or U0331 (FIG. 1: step c08), and the credit information input window U0400 shown in FIG. 5 is displayed on the orderer terminal S100 (FIG. 1: step c09).

If the orderer has already approved duplicate orders of a limited-duplicate item (if the orderer has pressed the button U0611 upon confirmation of duplicate orders prior to this window operation), and presses the OK button U0221 on the orderer information input window U0200 or the OK button U0341 on the delivery address information input window U0300 (FIG. 1: step c04), the information required for a payment is also passed to the payment system S410 (FIG. 1: step c08), and the credit information input window U0400 shown in FIG. 5 is displayed on the orderer terminal S100 (FIG. 1: step c09).

If an unlimited item is ordered, and if the orderer presses the OK button U0221 on the orderer information input window U0200 or the OK button U0341 on the delivery address information input window U0300 (FIG. 1: step c04), the information required for a payment is also passed to the payment system S410 (FIG. 1: step c08), and the credit information input window U0400 shown in FIG. 5 is displayed on the orderer terminal S100 (FIG. 1: step c09).

The radio buttons on the orderer information input window U0200 or delivery address information input window U0300 are displayed in correspondence with all payment systems that can accessed from that sales system S200. Alternatively, payment systems available for each user may be displayed.

The credit information input window U0400 is displayed when the payment system S410 is designed to receive a credit card payment. The window U0400 is a window which is provided by a payment system (more specifically, a server computer) of the payment system management company S400 (in this case, a credit card company) to the orderer terminal S100. On the window U0400, the orderer enters his or her credit card number and expiration date in input fields U0401 to U0403. If the orderer need not input information that can specify a person or information indicating paying capacity (in this case, a credit card number) of the orderer like in credit card payment, the window U0400 is not required. For example, in case of a convenience store payment that allows the orderer to make a payment at a convenience store, the window U0400 is not required. If an input process on a window corresponding to the window U0400 is not required, the orderer presses the OK button U0221 on the window U0200 or the OK button U0341 on the window U0300 (FIG. 1: step c04). In response to this operation, the order result display window U0500 in FIG. 6 or the order result display window U0600 in FIG. 7 is displayed (FIG. 1: step c15 or i04). If information that can specify a person or information indicating paying capacity is required to be input, input of information required by that payment system S410 is required as in the credit information input window U0400. Since this embodiment is not designed for a specific payment system, the layout and the like of the window U0400 are not particularly limited.

If a window corresponding to the credit information input window U0400 is not required, and the orderer presses the OK button U0221 on the orderer information input window U0200 or the OK button U0341 on the delivery address information input window U0300 (FIG. 1: step c04), the sales system S200 checks the presence/absence of duplicate orders again (FIG. 1: step c12). Even when the orderer presses an OK button U0410 on the credit information input window U0400 (or an equivalent window) (FIG. 1: step c10), the sales system S200 also checks the presence/absence of duplicate orders again (FIG. 1: step c12). If the already valid order is present, i.e., duplicate orders are to be placed, the order result display window U0600 shown in FIG. 7 is displayed on the orderer terminal S100 (FIG. 1: step i04). The presence/absence of duplicate orders is checked for a non-duplicate item or limited duplicate item, but is not checked for an unlimited item.

If a duplicate order of a limited-duplicate item is placed, the order result display window U0600 including the confirmation button U0611 is displayed on the orderer terminal S100. As for an unlimited item, the duplicate order check process in step c12 itself is skipped. Also, even when a limited-duplicate item is ordered, if the confirmation button U0611 has been pressed in step c02 or c05, the duplicate order check process in step c12 itself is skipped.

The order result display window U0500 in FIG. 6 is displayed by one of the following operations (FIG. 1: step c15):

(1) when the orderer presses the confirmation button U0611 on the order result display window U0600 (FIG. 1: step i05);

(2) when an unlimited item has been ordered, and when the orderer presses the OK button U0221 on the window U0200 or the OK button U0341 on the window U0300 (FIG. 1: step c04) when the payment system S410 has no unique window;

(3) when the orderer has approved an order of a limited-duplicate item, and when the he or she presses the OK button U0221 on the window U0200 or the OK button U0341 on the window U0300 (FIG. 1: step c04) when the payment system S410 has no unique window;

(4) when an unlimited item is ordered, and when the orderer presses the OK button U0410 on the credit information input window U0400 (FIG. 1: step c10) when the payment system S410 has a unique window; and (5) when the orderer has approved an order of a limited-duplicate item, and when the orderer presses the OK button U0410 on the credit information input window U0400 (FIG. 1: step c10) when the payment system S410 has a unique window.

In one of the aforementioned five cases, the order result display window U0500 in FIG. 6 is displayed (FIG. 1: step c5).

The order result display window U0500 displays, based on information which is input from the payment system S410 and indicates whether or not a payment has been accepted (FIG. 1: step c11), whether or not the order is normally accepted using a message U0501. An order number U0502 describes information of the order which is accepted or not accepted. The order number is displayed as an example, but detailed information may be displayed instead. If the orderer presses an OK button U0510, the application window U0100 is displayed, and the orderer can place an order of another item/service.

As described above, the orderer can place an order of a desired item or the like, and duplicate orders of an item, which do not make any orderer's benefit, are alerted. For this reason, duplicate purchases of an item or the like can be prevented. Also, for an item which limits duplicate sales for an identical orderer, a sales can be made according to that limitation.

<Access from Administrator to This Embodiment>

Figure 10:
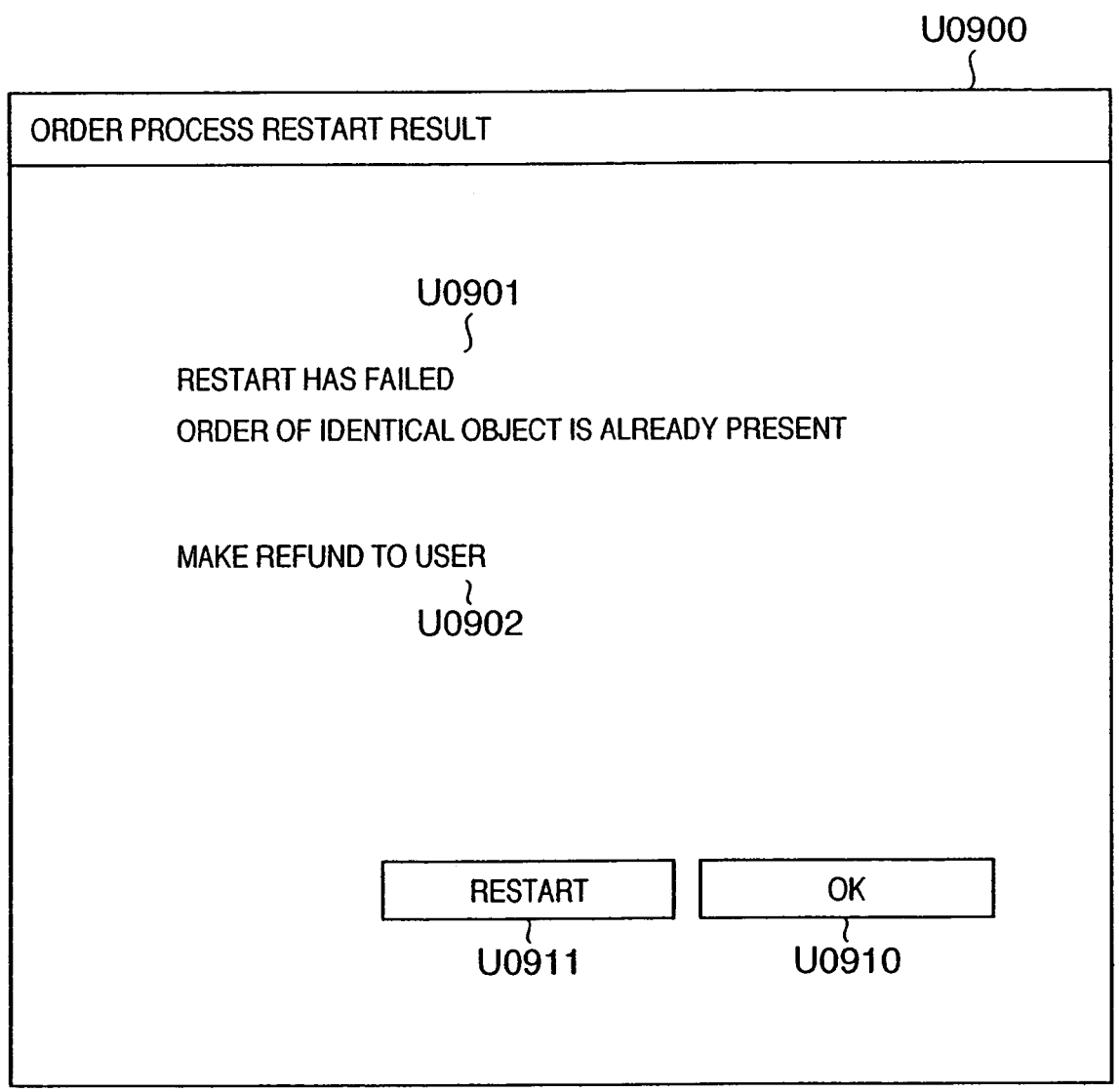
FIG. 10 shows a window used to display the result when the system administrator executes an order restart process.

The behavior when this embodiment is accessed from the administrator terminal S500 will be described below. FIGS. 8 to 10 respectively show an order list window U0700, order detail window U0800, and restart result window U0900. The administrator checks order process status data using the order list window U0700, order detail window U0800, and restart result window U0900 displayed on the administrator terminal S500, and can execute an order restart process.

The order restart process is done by the administrator terminal S500 when a payment based on the information on the payment system S410 side is normally completed but status data of the order of interest included in an order information table (shown in FIG. 11) held by the information holding means S270 does not indicate completion. During an order process from the orderer, after the payment information providing means S250 passes information required for a payment to the payment system S410 (step c08 in FIG. 1), and a process in the payment system management company starts, some failure may occur. If information (step c11) indicating whether or not a payment has been accepted is not supplied from the payment system S410 to the sales system S200 due to such failure, the sales system S200 cannot distinguish such case from a case wherein the orderer himself or herself closes the credit information input window U0400 on the terminal S100.

However, these two cases are different in the following points. When the orderer himself or herself closes the credit information input window U0400 on the terminal S100, the order is canceled, and no sales contract is concluded in the sales system S200. For this reason, consistency of information held by the two systems is maintained even when the payment of the order of interest is not accepted in the payment system S410. By contrast, when information (step c11) indicating whether or not a payment has been accepted is not supplied from the payment system S410 to the sales system S200 due to a failure or the like of the payment system S410, the payment for the order of interest is complete in the payment system S410, although a sales contract is not concluded since the order process is interrupted. In such case, consistency of information held by the two system is lost.

In this case, the administrator can normally recognize that the payment is normally completed, using the payment system management tool S430 and the like directly or via the administrator terminal S500. If the status, held in the information holding means S270, of the order whose payment is normally completed does not indicate completion, the order process must be restarted from the interrupted state. The order restart process is a function for this purpose. Whether or not a payment is normally completed is periodically monitored by the administrator.

FIG. 8 shows the order list window U0700 which is displayed on the administrator terminal S500 by the administrator means S300. As for a mechanism before the order list window U0700 is displayed, a database held in the information holding means S270 may be searched upon depression of a given button, and a list of valid orders may be displayed (FIG. 1: step a01). Alternatively, the order list window U0700 may always be displayed at a specific URL, the database held in the information holding means S270 may be searched at given time intervals, and a list of valid orders may be displayed (FIG. 1: step a01).

The order list window U0700 lists order numbers U0701, and the order numbers to be displayed change upon depression of a previous page button U0710 or next page button U0711. The previous page button U0710 does not appear on the first page, and the next page button U0711 does not appear on the last page.

Each order number U0701 has a link. Upon depression of the order number U0701 (link) (FIG. 1: step a02), the order detail window U0800 shown in FIG. 9 is displayed on the administrator terminal S500 (FIG. 1: step a03). This window displays an item name U0801, applicant U0803, delivery address U0804, payment method U0805, and creation date U0806. Also, more particular information may be displayed. In this embodiment, status U0802 indicates the currently completed step in FIG. 1. As status indication, an expression "after transition to the payment site" or the like which can be easily recognized by the administrator may be used. Upon depression of a back button U0811, the order list window U0700 is displayed again.

An order process restart button U0810 is pressed to execute the aforementioned order restart process. Upon depression of the order process restart button U0810, the restart result window U0900 is displayed. A result message U0901 shows a restart result. For example, when duplication is confirmed by the duplicate order checking means S260 (FIG. 1: step a06), and the restart process cannot be done, a window obtained by excluding display of a confirmation button U0911 from the window display of FIG. 10 is displayed. As for an item which does not inhibit the orderer from purchasing an identical item/service, and does not bring any orderer's disbenefit, the duplication check process in step a06 is skipped.

The administrator makes a refund to the orderer of the order of interest according to a job instruction displayed as a job instruction message U0902 using the payment system management tool S430 of the payment system management company S400, contacting the payment system administrator, or directly contacting the orderer. When an automatic refund process is done, as will be described later, no job instruction message U0902 is displayed. When the order process can be normally restarted, "restart is successful" is displayed as the result message U0901, and no job instruction message U0902 is displayed.

If it is determined that purchasing of an identical item/service may result in disbenefit, or confirmation is required for the orderer's benefit, a message that prompts the administrator to obtain orderer's confirmation is displayed as the job instruction message U0902, and the confirmation button U0911 is displayed (FIG. 1: step a10). The administrator presses the confirmation button U0911 after he or she obtains the orderer's confirmation (FIG. 1: step a11). Upon depression of the confirmation button U0911, the restart result display window U0900 including no confirmation button U0911 is displayed. At this time, "restart is successful" is displayed as the result message U0901, and no job instruction message U0902 is displayed.

Upon depression of an OK button U0910, the order list window U0700 is displayed on the administrator terminal S500, and the administrator can process another order.

With the aforementioned operation sequence, the administrator can restart or abort the interrupted order process, and can cancel a payment, thus maintaining consistency between the sales system and payment system. In this processing sequence, since duplicate orders of an item, which do not make any orderer's benefit, are alerted as in the order process from the orderer, duplicate purchases of an item or the like can be prevented. Also, for an item which limits duplicate sales for an identical orderer, a sales can be made according to that limitation.

In this embodiment, it is checked using the payment system management tool S430 and the like if a payment is normally accepted, and the administrator executes an order restart process using the administrator terminal S500 as needed. However, when the payment system S410 has a function of returning payment status in response to an order number, the ratio of automation of the order restart process can be further increased by the following method. Order information in the information holding means S270 is searched several times per day for an order, whose order process is interrupted after data transmission to the payment system S410. If such order is found, an inquiry as to whether or not the process in the payment system S410 is normally completed is sent to the payment system S410. If the order of interest has been normally processed in the payment system S410, the order restart process is executed automatically (a process equivalent to that executed when the administrator restarts the order process from the administrator terminal). If an orderer's or administrator's decision corresponding to steps a10 and a11 is required, a mail message is sent to the administrator. The administrator obtains orderer's confirmation, and manually restarts the order process, as described in this embodiment.

<Data Processing Method in This Embodiment: Information Holding Means>

Since the operations of the orderer and administrator have been explained, a mechanism required to effect these operations will be explained below. The table structures present in the information holding means will be explained first. The information holding means described in this embodiment assumes a relational database, and tables to be described later are those of the relational database. However, the present invention is not limited to the relational database as the information holding means.

FIG. 11 shows an order information table T0100 that stores order information. This table stores information associated with each order in an item code column T0102 to price column T0111 to have an order number T0101 as a principal key. The order information table T0100 is created in the processing sequence in FIG. 17 to be described later.

Status T0104 stores the currently completed step in FIG. 1. For example, after the OK button U0341 is pressed on the orderer terminal S100 and payment information is sent to the payment system S410, the status T0104 stores a code indicating that payment information is sent to the payment system S410, for example, "c08." Of course, the status management method is not limited to such specific method, and a value to be stored in the status T0104 is not particularly limited as long as it can appropriately indicate status.

Since the status is updated upon completion of each step, access to the information holding means S270 is made more frequently than in FIG. 1. However, assume that the status update process is included in each step, and a description thereof will be omitted. Also, a description of a read process from the information holding means S270 will be omitted for the sake of simplicity.

An item code T0102 stores an item code that specifies an item/service purchased by the orderer. When the item/service to be purchased by the orderer inhibits duplication purchases of an identical orderer (i.e., non-duplicate item), an item type T0103 stores "1." When purchasing of an identical item/service may result in disbenefit, or confirmation is required for the orderer's benefit (i.e., limited-duplicate item), the item type T0103 stores "2." For an item other than the above two item type (i.e., unlimited item), the item type T0103 stores "3." Each of the values "1" to "3" is copied from an item type T0602 of an item information table T0600, which is generated upon generating an order information record and will be described later, as an initial value. When the item/service to be purchased by the orderer requires orderer's confirmation for his or her benefit (i.e., the initial value of the item type T0102 is "2"), and orderer's confirmation is obtained since the orderer has pressed the confirmation button U0611 on the order result display window U0600 displayed on the orderer terminal S100, the item type T0103 stores "4."

A payment method T0106 stores a code indicating the payment system S410 used upon placing the order of interest. When the payment system used does not complete a payment instantaneously like a convenience store payment and has a payment due until money reception, this payment due is stored in a payment due T0107. Furthermore, a payment result T0108 is used to indicate payment status of this order. The payment result T0108 stores "1" when a payment reservation has been done (before money reception) like in a convenience store payment; "2" when no payment reservation is required, and a payment is normally completed like in a credit card payment; "3" when the payment due has expired without money reception after the payment reservation; "4" when the orderer terminal S100 is notified that the payment process is not completed, and a payment must be manually canceled; "5" when a payment is canceled; and "6" when a payment has failed due to a credit card number error or the like. The payment information acceptance means S240 normally changes the status from "1" to "2" due to money reception, and changes the status from "1" to "3" due to payment overdue on the basis of a message from the payment system S410. Also, the status can be changed from "1" to "3" when the sales system S200 itself checks the payment due T0107.

A user identifier T0109 stores a user ID. The user ID is assigned to each individual orderer when the orderer registers in advance. In this embodiment, the user ID can be registered in advance, but a non-registered orderer can purchase an item and service. However, assume that login authentication and the like have been done in respective steps described in this embodiment (i.e., before the application window U0100 is displayed). In the order process after the application window U0100, if the registered orderer presses the OK button U0110 on the application window U0100, the application acceptance means S210 is notified of the user ID of that orderer, even when whether or not the orderer is registered is explicitly indicated. In case of a non-registered orderer, the user ID T0109 stores a null value.

In addition, a creation date T0105 stores a date of the order placed, and a quantity T0110 stores the quantity of an item/service ordered by this order, and a price T0111 stores the total amount of this order.

FIG. 12 shows a user information table T0200 used when the orderer registers in advance. This table stores the user ID in a principal key T0201 and information of the registered orderer in columns T0202 to T0211. The user ID T0109 of the order information table stores the contents of the user ID T0201 of the user information table.

A family name T0202 stores the family name of the orderer's name, a first name T0203 stores the first name of the orderer's name, a postal code (upper) T0204 stores the upper 3 digits of a postal code, and a postal code (lower) T0205 stores the lower 4 digits of the postal code. A prefecture code T0206 stores a prefecture code, an address T0207 stores an address except for the prefecture name, an area code T0208 stores the area code of a telephone number, a local office number T0209 stores a local office number of the telephone number, a telephone number T0210 stores a telephone number except for the area code and local office number, and a mail address T0211 stores the mail address of the orderer. The same applies to columns which have the same names as those of these columns in an orderer information table T0300 and delivery address information table T0400 to be described later.

FIG. 13 shows an orderer information table T0300 which stores orderer information. This table stores the order number in a principal key T0301 and information associated with an orderer in columns T0302 to T0311. When the orderer registers in advance, data of this table need not always be required. In this embodiment, assume that data of this table are stored even for a registered orderer.

FIG. 14 shows a delivery address information table T0400 which stores information associated with a delivery address when an item/service purchased by the orderer requires delivery. This table stores the order number in a principal key T0401 and information associated with the delivery address in columns T0402 to T0411.

Figure 15:
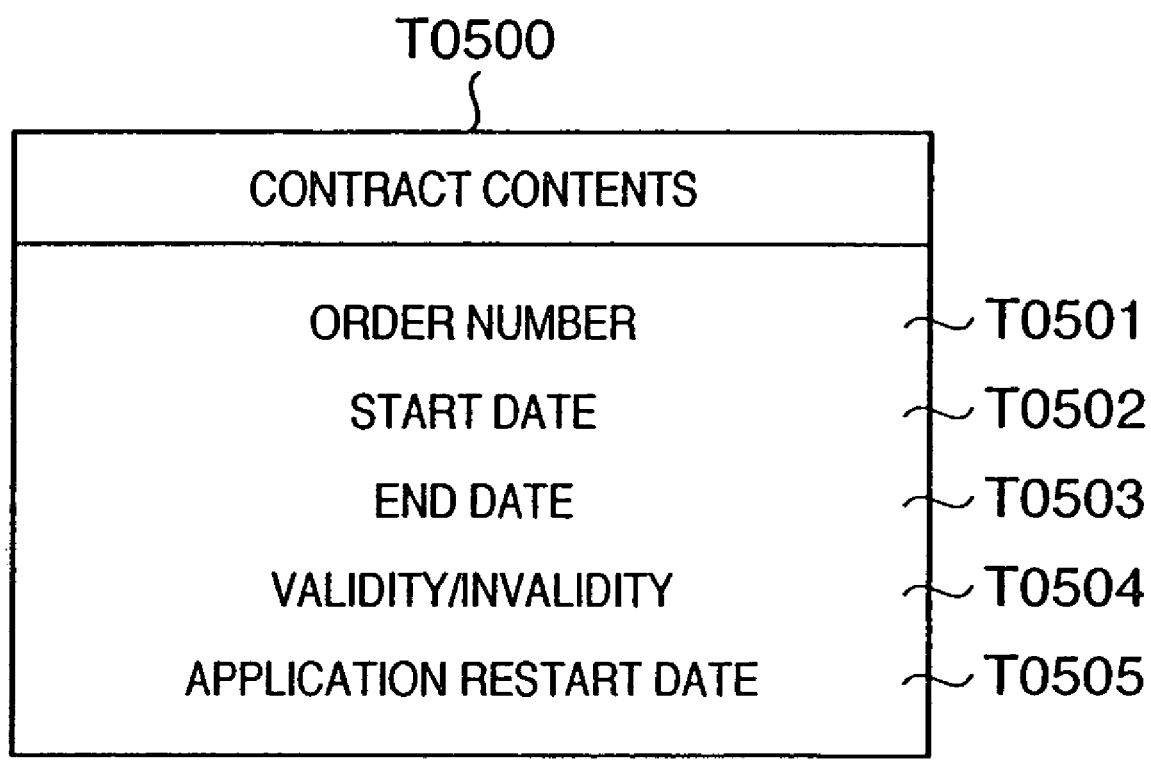
FIG. 15 shows an example of the data configuration of a table that stores contract content information.

FIG. 15 shows a contract content table T0500 that stores the contract contents of a service purchased by the orderer. This table stores the order number in a principal key T0501 and information associated with the contract contents in columns T0502 to T0505.

A start date T0502 stores a start date of the service, an end date T0503 stores an end date of the service, and a validity/invalidity T0504 stores the validity/invalidity of the service. Upon selling a service, the orderer is often inhibited from purchasing that service for a predetermined period. In such case, a date that lifts inhibition of an application must be able to be designated. An application restart date T0505 stores this date.

Figure 16:
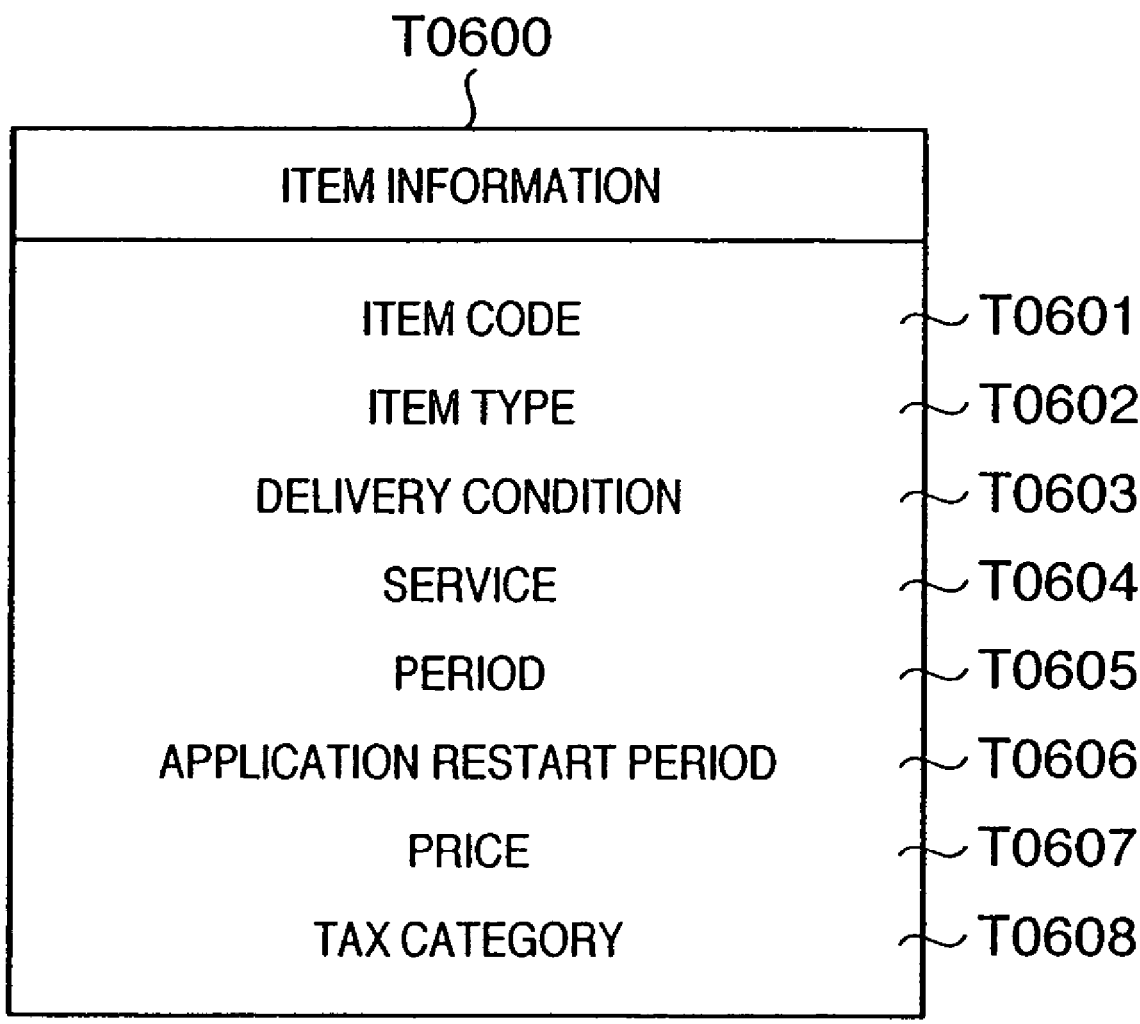
FIG. 16 shows an example of the data configuration of a table that stores item information.

FIG. 16 shows an item information table T0600 which stores the contents of an item. This table stores the item code in a principal key T0601, and information associated with the contents of an item in columns T0602 to T0608.

An item type T0602 stores "1" for a non-duplicate item which inhibits a single orderer from duplicate purchasing. The item type T0602 stores "2" for a limited-duplicate item, duplicate purchase of which results in an orderer's disbenefit, or which requires orderer's confirmation for an orderer's benefit. The item type T0602 stores "3" for an unlimited item other than the above two types. The item type T0602 is stored as the initial value of the status T0104 of the order information table T0100. A value "4" is stored only when the orderer has approved duplicate orders of a limited-duplicate item. Hence, this value is not stored in the item type T0602.

A delivery condition T0603 stores a value which indicates if a delivery address must be specified by the orderer, and is specified by an item/service purchased by the orderer. The delivery condition T0603 stores "1" when the delivery address must be designated; or "2" when the delivery address need not be designated.

A service T0604 stores a value which indicates if this item is a service contract. If this item is a service contract, the service T0604 stores "0;" otherwise, "1." A period T0605 stores a valid period of a contract if this item is a service contract. Upon selling a service, the orderer is often inhibited from purchasing that service for a predetermined period. In such case, a period required until inhibition of an application is lifted must be able to be designated. An application restart period T0606 stores this period.

A price T0607 stores a unit price of this item, and a tax category T0608 stores a value indicating if the price of this item includes tax. The price to be stored in the price T0111 is calculated based on the information stored in the price T0607 and tax category T0608, and the quantity of an item or the like designated by the orderer during the order process until the application window U0100 is displayed.

The order information table T0100, user information table T0200, orderer information table T0300, delivery address information table T0400, contract content table T0500, and item information table T0600 are minimum required tables in this embodiment. However, other kinds of tables may be prepared. For example, a table that manages the administrator, a table that manages the breakdown of an item/service ordered by the orderer, and the like may be prepared. Since these tables are not indispensable, a description thereof will be omitted. Also, a table that manages the types of payment systems S410 (to be described later) may be prepared. However, in this embodiment, such information is hard-coded in the payment information providing means, payment information acceptance means, and the like.

<Data Processing Method in This Embodiment: Order by Orderer>

How to operate the sales system S200 upon placing an order at the orderer terminal S100 will be described below with reference to FIG. 1, FIGS. 17A and 17B, and FIGS. 18A and 18B. Note that the broken lines in the flowcharts indicate interrupts by the operations of other means in the sales system S200 and orderer terminal S100.

With this sequence, new records of the order information table T0100 and orderer information table T0300 are generated, and new records of the delivery address information table T0400 and contract content table T0500 are also generated as needed. However, these new records are added by a process to be described later, and required information is temporarily stored in a work area assured on a memory or the like of a computer on which the program of the application acceptance means S210 runs, and is referred to and updated during the process. Information to be saved temporarily includes information associated with the orderer and information associated with the delivery address, which are input during the process, and the records of the item table T0600 and user information table T0200, which are obtained by a search, in addition to the item code, item type, user ID, and delivery condition. These pieces of information to be temporarily saved in the memory will be specified by appending words "saved in a temporary memory" in the following description. Note that such words may be omitted if it is apparent from the context. The update process of the status T0104 is executed in respective steps in FIG. 1 after new records are generated, and will not be cited in the following description.

When these pieces of information to be temporarily saved are saved in the memory or the like in the forms of the order information table T0100, orderer information table T0300, delivery address information table T0400, and contract content table T0500, they can be directly added to the tables if appropriate values are written in fields (e.g., creation date and the like) to be filled upon updating the tables.

Figure 17A:
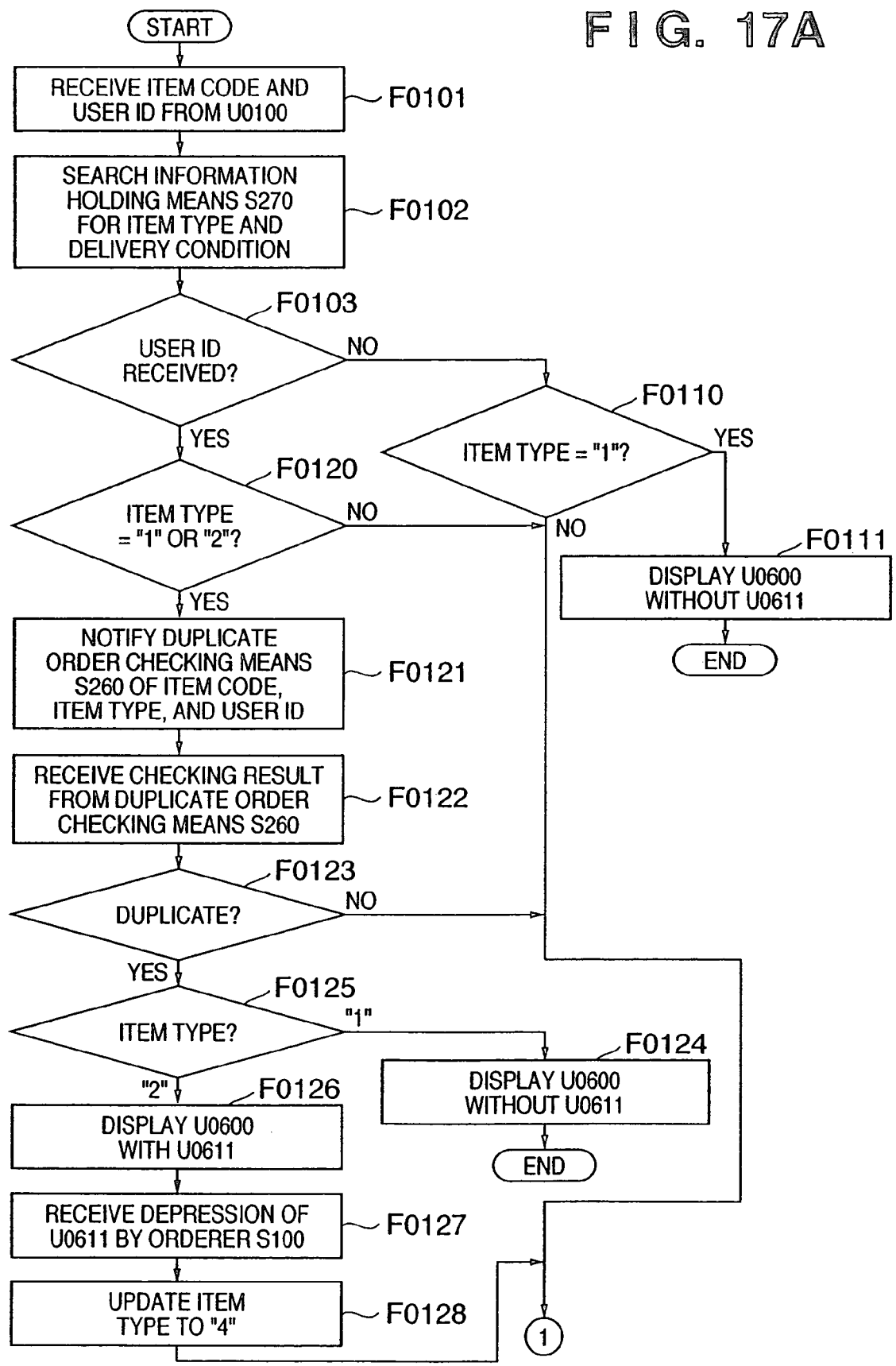
FIG. 17A is a flowchart of an application acceptance means.

The application window U0100 is embedded with the item code of an item selected by the orderer. Upon depression of the button U0110 on the window U0100 displayed on the orderer terminal S100, the item code of the item/service to be purchased by the orderer is passed from the window U0100 to the application acceptance means S210. If the orderer is a registered orderer, the user ID is also supplied from the application window U0100 to the application acceptance means S210 (FIG. 1: step c01, FIG. 17A: step F0101). The user ID may be input by the orderer in a stage before the application window U0100 is displayed, or information stored at a predetermined storage location may be appended as the user ID. The application acceptance means S210 searches the item information table T0600 in the information holding means S270 for an item type and delivery condition corresponding to the item code, and saves them in the temporary memory in correspondence with the item code and user ID (if it is input) (FIG. 17A: step F0102). If the found item type is "1" or "2," and the user ID is notified (FIG. 17A: step F0120), the item code, item type, and user ID are sent to the duplicate order checking means S260 (FIG. 1: step c02, FIG. 17A: step F0121).

The duplicate order checking means S260 that receives the item code, item type, and user ID checks duplication of orders by a method to be described later. If duplication is found, the duplicate order checking means S260 notifies the application acceptance means S210 of duplication. The application acceptance means S210 which receives a message indicating duplication (FIG. 17A: steps F0122 and F0123) displays the order result display window U0600 on the orderer terminal S100 (FIG. 1: step i01, FIG. 17A: steps F0125, F0124, and F0126). If the item type saved in the temporary memory is "1" (FIG. 17A: step F0125), no confirmation button U0611 is displayed (FIG. 17A: step F0124); if it is "2" (FIG. 17A: step F0125), the confirmation button U0611 is displayed (FIG. 17A: step F0126).

Figure 17B:
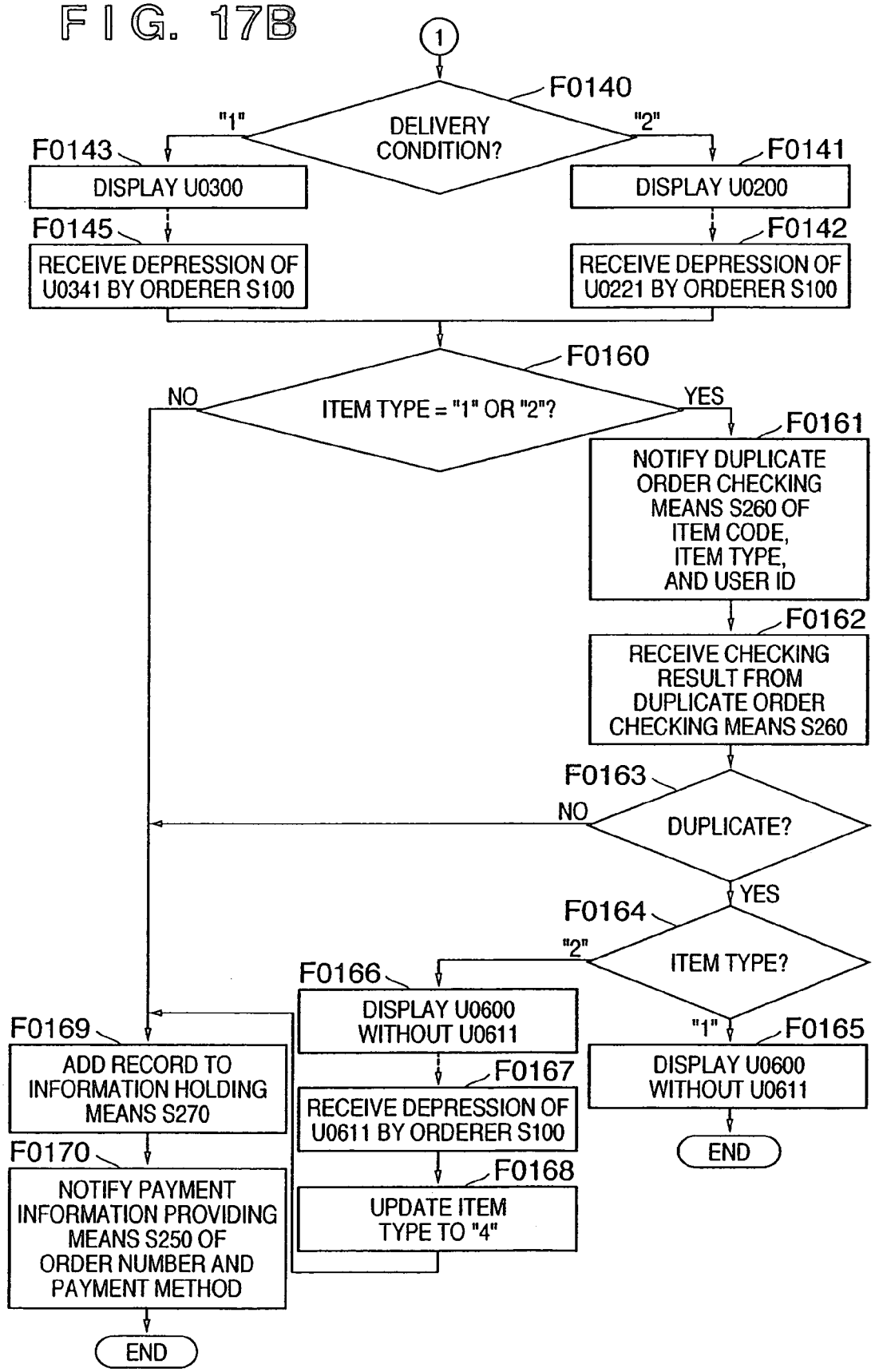
FIG. 17B is a flowchart of the application acceptance means.

If the orderer has pressed the confirmation button U0611 of the window U0600 on the terminal S100 (FIG. 1: step i02, FIG. 17A: step F0127), the application acceptance means S210 updates the item type saved in the temporary memory to "4" (FIG. 17A: step F0128). Then, the delivery condition saved in the temporary memory is checked (FIG. 17B: step F0140). If the value of the delivery condition is "1," the delivery address information input window U0300 is displayed (FIG. 1: step c03, FIG. 17B: step F0143); if the value of the delivery condition is "2" (FIG. 17B: step F0140), the orderer information input window U0200 is displayed (FIG. 1: step c03, FIG. 17B: step F0141).

If the application acceptance means S210 receives a message indicating the absence of any duplicate order from the duplicate order checking means S260 (FIG. 17A: steps F0122 and F0123), the delivery condition stored in the temporary memory is checked (FIG. 17B: step F0140). If the value of the delivery condition is "1," the delivery address information input window U0300 is displayed (FIG. 1: step c03, FIG. 17B: step F0143); if the delivery condition is "2" (FIG. 17B: step F0140), the orderer information input window U0200 is displayed (FIG. 1: step c03, FIG. 17B: step F0141).

On the other hand, if it is determined in step F0103 that no user ID is notified, the item type saved in the temporary memory is checked (FIG. 17A: step F0110). If the value of the item type is "1," the order result display window U0600 is displayed (FIG. 1: step i01, FIG. 17A: step F0111). In this case, "this item/service can be purchased by only a registered orderer" is displayed as the result message U0601, and neither buttons U0602 and U0611 appear. If the user ID is notified, and the item type saved in the temporary memory is other than "1" and "2" (FIG. 17A: step F0120—NO), or if no user ID is notified, and the item type saved in the temporary memory is other than "1" (FIG. 17A: step F0110—NO), the delivery condition is checked (FIG. 17A: step F0140). If the value of the delivery condition is "1," the delivery address information input window U0300 is displayed (FIG. 1: step c03, FIG. 17B: step F0143); if the delivery condition is "2" (FIG. 17A: step F0140), the orderer information input window U0200 is displayed (FIG. 1: step c03, FIG. 17B: step F0141).

If the orderer has pressed the OK button U0221 or U0341 on the orderer information input window U0200 or delivery address information input window U0300 displayed on the orderer terminal S100 (FIG. 1: step c04, FIG. 17B: step F0142 or F0145), and if the item type saved in the temporary memory is "1" or "2" (FIG. 17B: step F0160—YES), the application acceptance means S210 notifies the duplicate order checking means S260 of the item code, item type, and user ID (if it is available) which are saved in the temporary memory (FIG. 1: step c05, FIG. 17B: step F0161).

The duplicate order checking means S260 which receives the item code, item type, and user ID checks duplication by a method to be described later. If duplication is found, the duplicate order checking means S260 notifies the application acceptance means S210 of duplication. The application acceptance means S210 which receives a message indicating duplication (FIG. 17B: steps F0162 and F0163) displays the window U0600 on the orderer terminal S100 (FIG. 1: step i01, FIG. 17B: steps F0163, F0164, F0165, and F0166). If the item type saved in the temporary memory is "1" (FIG. 17B: step F0164—"1"), no button U0611 is displayed (FIG. 17B: step F0165); if it is "2" (FIG. 17B: step F0164—"2"), the button U0611 is displayed (FIG. 17B: step F0166).

If the orderer has pressed the confirmation button U0611 of the order result display window U0600 on the terminal S100 (FIG. 1: step i02, FIG. 17B: step F0167), the application acceptance means S210 updates the item type saved in the temporary memory to "4" (FIG. 17B: step F0168). If the item type saved in the temporary memory is neither "1" nor "2" (FIG. 17B: step F0160), if a message indicating no duplication is received from the duplicate order checking means S260 (FIG. 17B: steps F0162 and F0163), or if the orderer has pressed the confirmation button U0611 on the window U0600 and the item type saved in the temporary memory is updated to "4" (FIG. 17B: step F0168), the application acceptance means S210 adds information of the order of interest as new records to the tables T0100, T0300, and T0400 in the information holding means S270 (FIG. 1: step c06, FIG. 17B: step F0169).

The records to be added are generated on the basis of information saved in the temporary memory, that is, the item code, item type, user ID, and delivery condition. An order number is newly assigned in this stage. In order to sequentially assign the order numbers, if an order sequence is included in a DBMS used to implement the information holding means S270 includes, it may be used, or a register or the like whose value is incremented every time an order number is assigned may be prepared, and its value may be assigned. For example, in order to generate a record of the order information table T0100, a new order number is assigned, and a new record to be added is generated on the basis of the item code, item type, payment method, user ID, quantity, and price, which are input or found by search and are temporarily saved, and is added to the table. The same applies to other tables T0300 and T0400.

The application acceptance means S210 notifies the payment information providing means S250 of the order number and the payment method selected on the orderer information input window W0200 or delivery address information input window U0300 (FIG. 1: step c07, FIG. 17B: step F0170). The payment information providing means S250 acquires price data of the order of interest using the order number notified from the order information table T0100 on the information holding means S270. Also, the payment information providing means S250 acquires other kinds of required information from the information holding means S270 according to the property of the payment system 410. Then, the payment information providing means S250 notifies the payment system S410 of information (FIG. 1: step c08).

Upon reception of information such as the order number, price, and the like from the payment information providing means S250, the payment system S410 displays the window U0400 on the orderer terminal S100 (FIG. 1: step c09). If the orderer enters required information to the card number column U0401 and expiration date columns U0402 and U0403, and presses the OK button U0410 (FIG. 1: step c10), the payment system S410 notifies the payment information acceptance means S240 of information (the order number and the like) required to specify the order, and the corresponding payment result (FIG. 1: step c11).

The flow of information when the payment system S410 prompts the orderer to input information using a window different from the window U0400 is the same as that in steps c08 to c11. However, the payment information providing means S250 and payment information acceptance means S240 must have functions corresponding to the payment system S410. Also, when the payment system S410 does not display any window on the orderer terminal S100, steps c09 and c10 are not required, and the orderer terminal S100 and payment system S410 do not exchange any information, but the flow of other information remains the same.

Figure 18A:
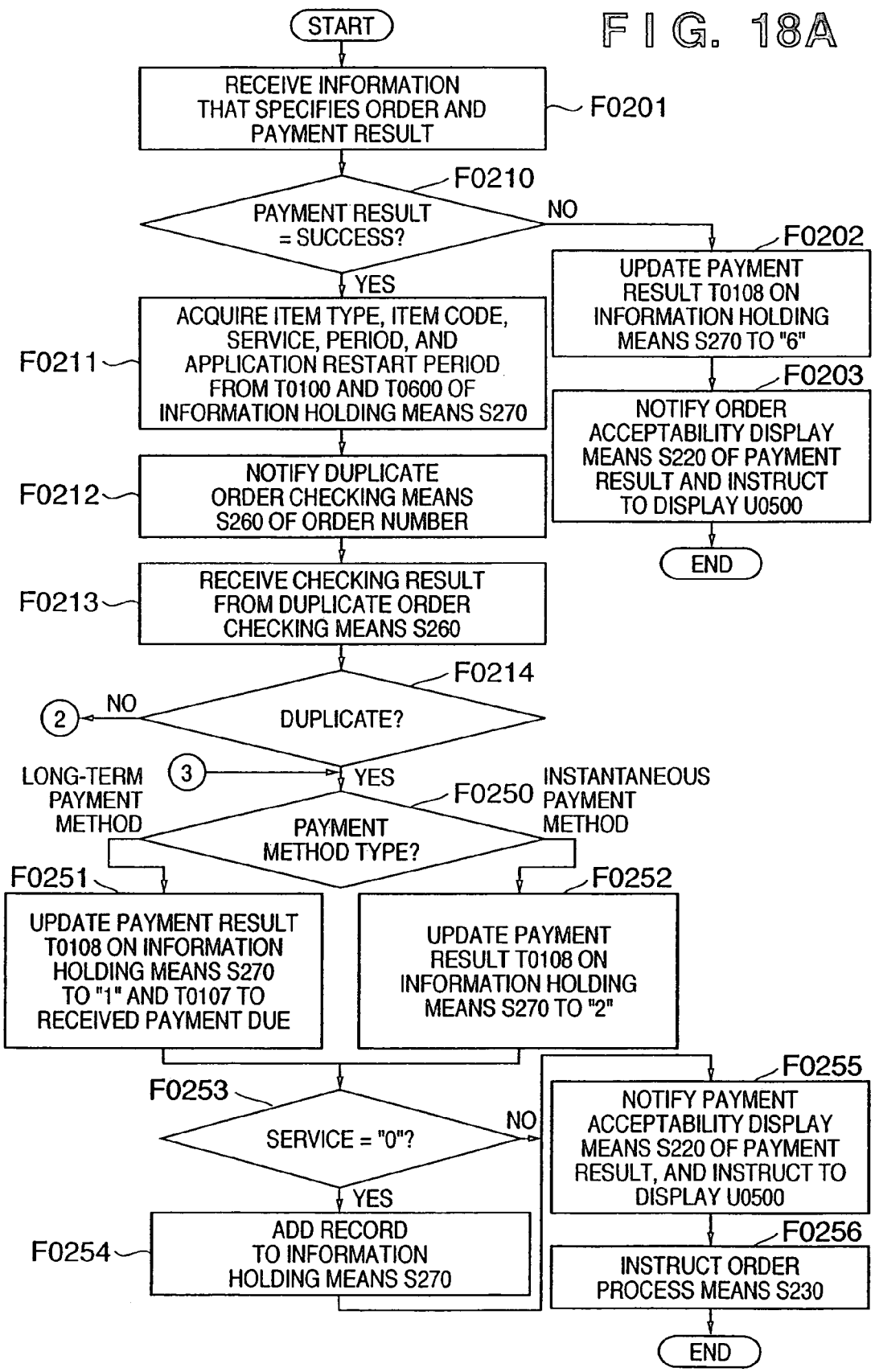
FIG. 18A is a flowchart of a payment information acceptance means.
Figure 18B:
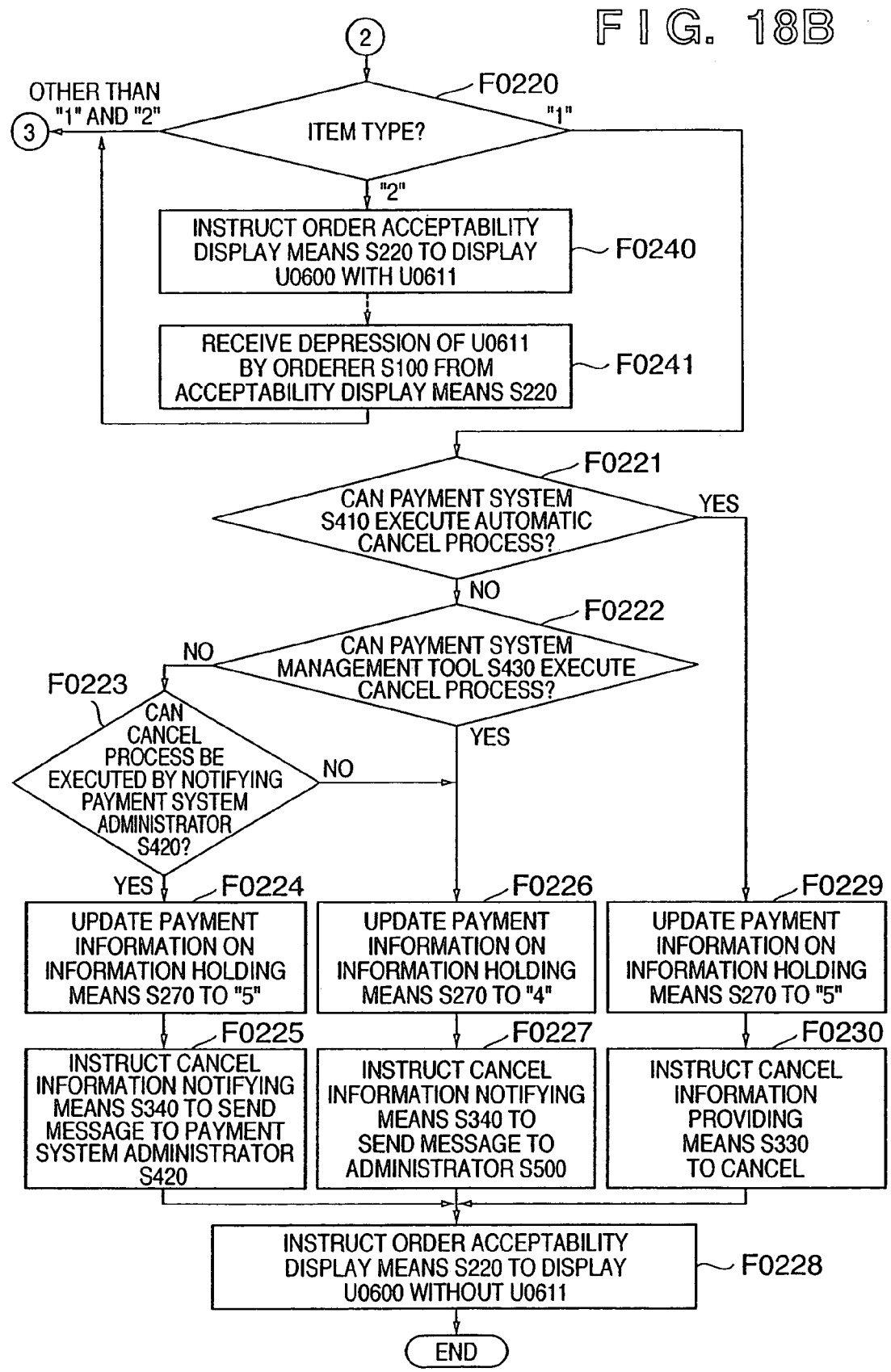
FIG. 18B is a flowchart of the payment information acceptance means.

FIGS. 18A and 18B show the processing sequence executed by the sales system S200 which receives a payment result message from the payment system S410.

Upon reception of the information (the order number and the like) required to specify the order, and the corresponding payment result (FIG. 18A: step F0201), if the payment result indicates a failure (FIG. 18A: step F0210—NO), the payment information acceptance means S240 updates, to "6," the payment result T0108 in the record of the order of interest in the order information table T0100 held on the information holding means S270 (FIG. 1: step c13, FIG. 18A: step F0202), and notifies order acceptability display means S220 of that payment result to instruct it to display the order result display window U0500 (FIG. 1: step c14, FIG. 18A: step F0203). Upon reception of the instruction, the order acceptability display means S220 displays the window U0500 including a message "payment has failed" U0501 on the orderer terminal S100 (FIG. 1: step c15). As for the payment method which makes a payment reservation, and completes a payment after money reception (e.g., cash) like in a convenience store payment or the like, the payment result includes a payment due.

If the payment result indicates success (FIG. 18A: step F0210—YES), the payment information acceptance means S240 acquires the item type and item code of the order of interest from the order information table T0100, and also service, period, and application restart date data corresponding to that item code from the item information table T0600 (FIG. 18A: step F0211). The means S240 notifies the duplicate order checking means S260 of the order number (FIG. 1: step c12, FIG. 18A: step F0212). Upon reception of the order number, the duplicate order checking means S260 checks duplication of orders by a method to be described later. If duplication is found, the duplicate order checking means S260 notifies the payment information acceptance means S240 of duplication. The payment information acceptance means S240 which receives a message indicating duplication (FIG. 18A: steps F0213 and F0214) instructs the order acceptability display means S220 to display the order result display window U0600 (FIG. 1: step i03, FIG. 18B: step F0240), if the item type is "2" (FIG. 18B: step F0220—"2").

If the order acceptability display means S220 displays the order result display window U0600 on the orderer terminal S100 (FIG. 1: step i04), and the orderer has pressed the confirmation button U0611 on the window U0600 (FIG. 1: step i05), the order acceptability display means S220 sends a message that advises accordingly to the payment information acceptance means S240 (FIG. 1: step i06, FIG. 18B: step F0241). The order acceptability display means S220 updates the payment result T0108 of the record corresponding to the order of interest in the order information table T0100 on the information holding means S270 to "1" or "2" (FIG. 1: step c13, FIG. 18A: steps F0250, F0251, and F0252). The payment result T0108 is updated to "1" (FIG. 18A: step F0251) when the payment system S410 adopts a payment method which makes a payment reservation, and completes a payment after money reception (e.g., cash) like in a convenience store payment or the like (to be referred to as a long-term payment method hereinafter) (FIG. 18A: step F0250—"long-term payment method"). At the same time, the payment due T0107 is also updated to the payment due notified from the payment system (FIG. 18A: step F0251). The payment result T0108 is updated to "2" (FIG. 18A: step F0252) when the payment system S410 adopts a payment method which has no concept of a payment reservation and completes a payment without any money reception (cash or the like) like in a credit card payment (to be referred to as an instantaneous payment method hereinafter) (FIG. 18A: step F0250—"instantaneous payment method").

If the service T0604 acquired from the item information table T0600 is "0" (FIG. 18A: step F0253—YES), a record is further added to the contract content table T0500 on the information holding means S270 (FIG. 1: step c13, FIG. 18A: step F0254). The start date T0502 stores the current time, the end date T0503 stores a value calculated based on the current time and the period T0605 acquired from the item information table T0600, the application restart date T0505 stores a value calculated based on the current time and the application restart period T0606 acquired from the item information table T0600, and the validity/invalidity T0504 stores "valid." After that, the payment information acceptance means S240 instructs the order acceptability display means S220 to display the order result display window U0500 (FIG. 1: step c14, FIG. 18A: step F0255). Upon reception of the display instruction of the order result display window U0500, the order acceptability display means S220 displays the window U0500 on the orderer terminal S100 (FIG. 1: step c15). The payment information acceptance means S240 instructs the order process means S230 to execute an order process (FIG. 1: step c16, FIG. 18A: step F0256).

If it is determined in step F0220 that the item type is "1," the payment information acceptance means S240 instructs the cancel information providing means S330 or cancel information notifying means S340 to execute a cancel process to the payment system S410 (FIG. 1: step c18 or c17, FIG. 18B: step F0225, F0227, or F0230), and updates the payment result T0108 of the record corresponding to the order of interest of the order information table T0100 on the information holding means S270 to "4" or "5" (FIG. 1: step c13, FIG. 18B: step F0224, F0226, or F0229). The payment result T0108 is updated to "4" (FIG. 18B: step F0226) when the payment system S410 cannot automatically execute a cancel process, but the payment system management tool S430 can execute a cancel process (FIG. 18B: steps F0221 and F0222). The payment result T0108 is updated to "5" (FIG. 18B: step F0224 or F0229) when the payment system S410 can automatically execute a cancel process (FIG. 18B: step F0221) or when neither the automatic cancel process nor the cancel process of the payment system management tool S430 are made, but a cancel process can be done by sending a mail message to the administrator (FIG. 18B: steps F0221, F0222, and F0223). Such classifications are notified from, e.g., the payment system or such information is given to the sales system in advance. After that, the payment information acceptance means S240 instructs the order acceptance display means S220 to display the order result display window U0600 (FIG. 1: step i03, FIG. 18B: step F0228). At this time, no confirmation button U0611 appears.

Note that the following process is done when the payment information acceptance means S240 instructs the payment system S410 to execute a cancel process. When the payment system S410 can execute an automatic cancel process (FIG. 18B: step F0221—YES), the payment information acceptance means S240 instructs the cancel information providing means S330 to execute a cancel process of the order of interest to the payment system S410 (FIG. 1: step c18, FIG. 18B: step F0230). The cancel information providing means S330 executes a cancel process by a method corresponding to the payment system S410 (FIG. 1: step a13).

When the automatic cancel process cannot be done but the payment system management tool S430 can execute a cancel process (FIG. 18B: step F0221→F0222—YES), the payment information acceptance means S240 instructs the cancel information notifying means S340 to send a mail message that advises accordingly to the administrator terminal S500 (FIG. 1: step a16) (FIG. 1: step c17, FIG. 18B: step F0227). In response to this message, the administrator cancels the order of interest using the payment system management tool S430 at the administrator terminal S500 (FIG. 1: step a18).

When neither the automatic cancel process nor the cancel process of the payment system management tool S430 are made but the cancel process can be made by sending a mail message to the payment system administrator S420 (FIG. 18B: step F0221→F0222→F0223—YES), the payment information acceptance means S240 instructs the cancel information notifying means S340 to send a mail message indicating that the order of interest is to be canceled to the payment system manager S420 (FIG. 1: step a15) (FIG. 1: step c17, FIG. 18B: step F0225).

If it is determined in step F0213 that the payment information acceptance means S240 receives from the duplicate order checking means S260 a message indicating that no duplicate order is found (FIG. 18A: step F0213), or if the item type of the item of interest is neither "1" nor "2" (FIG. 18A: step F0220), the payment information acceptance means S240 updates the payment result T0108 of the record corresponding to the order of interest in the order information table T0100 on the information holding means S270 to "1" or "2" (FIG. 1: step c13, FIG. 18A: steps F0251 and F0252). The payment result T0108 is updated to "1" (FIG. 18A: step F0251) when the payment system S410 adopts a long-term payment method as a payment method (FIG. 18A: step F0250—"long-term payment method"). At the same time, the payment due T0107 is also updated to the payment due notified from the payment system (FIG. 18A: step F0251). The payment result T0108 is updated to "2" (FIG. 18A: step F0252) when the payment system S410 adopts an instantaneous payment method as a payment method (FIG. 18A: step F0250—"instantaneous payment method"). If the service T0604 acquired from the item information table T0600 is "0" (FIG. 18A: step F0253—YES), a record is further added to the contract content table T0500 on the information holding means S270 (FIG. 1: step c13, FIG. 18A: step F0254). The start date T0502 of the added record stores the current time, the end date T0503 stores a value calculated based on the current time and the period T0605 acquired from the item information table T0600, the application restart date T0505 stores a value calculated based on the current time and the application restart period T0606 acquired from the item information table T0600, and the validity/invalidity T0504 stores "valid." After that, the payment information acceptance means S240 instructs the order acceptability display means S220 to display the order result display window U0500 (FIG. 1: step c14, FIG. 18A: step F0255). Upon reception of the display instruction of the order result display window U0500, the order acceptability display means S220 displays the window U0500 (FIG. 1: step c15). The payment information acceptance means S240 instructs the order process means S230 to execute an order process (FIG. 1: step c16, FIG. 18A: step F0256).

<Data Processing Method in this Embodiment: Order Restart by Administrator>

Furthermore, a mechanism of the operation when the order restart process is done at the administrator terminal S500 will be described below using FIG. 1.

The administration means S300 acquires information associated with an order (e.g., an order number and the like included in the order information table) from the information holding means S270, and displays the order list window U0700 on the administrator terminal S500 (FIG. 1: step a01). If the administrator has clicked the order number U0701 on the administrator terminal S500 (FIG. 1: step a02), the administration means S300 acquires order information records corresponding to the selected order number from the order information table T0100, orderer information table T0300, and delivery address information table T0400 using the order number received upon clicking of the order number U0701. Then, the administration means S300 displays the order detail window U0800 on the administrator terminal S500 using the acquired information (FIG. 1: step a03). If the status is c08, the payment system described in the payment method is an instantaneous payment method, and the creation data is old enough, since a problem is more likely to occur in step c11, whether or not the payment of the order of interest is normally completed is checked using the payment system management tool S430 (FIG. 1: step a18). Alternatively, an inquiry is sent to the payment system administrator S420 (FIG. 1: step a17). As a result, if it is confirmed that the process in the payment system S410 is normally completed, the administrator must execute an order restart process by pressing the button U0810 on the administrator terminal S500.

When the administrator has pressed the restart button U0810 on the administrator terminal S500 (FIG. 1: step a04), the administration means S300 instructs the order restart means S310 to execute an order restart process (FIG. 1: step a05). Upon reception of the order restart process instruction, the order restart means S310 notifies the duplicate order checking means S260 of the order number (FIG. 1: step a06). Upon reception of the order number, the duplicate order checking means S260 checks duplication of orders by a method to be described later. If duplication is found, the duplicate order checking means S260 notifies the order restart means S310 of duplication. Upon reception of the message indicating duplication, the order restart means S310 acquires the item type of the order of interest from the order information table T0100.

If the item type of the order of interest is "1," the order restart means S310 instructs the order acceptability display means S320 for the administrator (FIG. 1: step a07) to display the restart result display window U900 on the administrator terminal S500 (FIG. 1: step a10). At this time, no restart confirmation button U0911 appears. If the payment system S410 cannot execute an automatic cancel process, but the payment system management tool S430 can execute a cancel process, the message U0902 that prompts the administrator terminal S500 to execute the cancel process is displayed, as shown in FIG. 10. In this case, a mail message may be sent to the administrator terminal (FIG. 1: steps a14 and a16). In this case, the payment result T0108 for the order of interest in the order information table T0100 in the information holding means S270 is updated to "4" (FIG. 1: step a08).

If the payment system S410 can execute an automatic cancel process, or if neither the automatic cancel process nor the cancel process of the payment system management tool S430 are made but a cancel process can be done by sending a mail message or the like to the payment system administrator, no message U0902 appears. If the payment system S410 can execute an automatic cancel process, the order acceptability display means S320 for the administrator instructs the cancel information providing means S330 to execute a cancel process to the payment system S410 (FIG. 1: step a12). In this case, the payment result T0108 for the order of interest in the order information table T0100 in the information holding means S270 is updated to "5" (FIG. 1: step a08).

Upon reception of the cancel process instruction, the cancel information providing means S330 instructs to execute the cancel process to the payment system S410 (FIG. 1: step a13). If neither the automatic cancel process nor the cancel process of the payment system management tool S430 are made but a cancel process can be done by sending a mail message or the like to the payment system administrator, the order acceptability display means S320 for the administrator instructs the cancel information notifying means S340 to send, for example, a mail message indicating that the order of interest is to be canceled to the payment system administrator S420 (to a computer or the like used by that administrator in practice) (FIG. 1: step a14). In this case, the payment result T0108 for the order of interest in the order information table T0100 in the information holding means S270 is updated to "5" (FIG. 1: step a08). Upon reception of the instruction, the cancel information notifying means S340 sends, for example, a mail message indicating that the order of interest is to be canceled to the payment system administrator S420 (FIG. 1: step a15).

If the item type of the order of interest is "2," the administration means S300 instructs the order acceptability display means S320 for the administrator (FIG. 1: step a07) to display the restart result display window U0900 (FIG. 1: step a10). At this time, the restart button U0911 appears, and the message U0902 "obtain user's confirmation" is displayed. When the user who is required to confirm wants to restart the order process, the administrator presses the restart button U0911 displayed on the terminal S500 (FIG. 1: step a11). In response to this operation, the order acceptability display means S320 for the administrator updates the item type T0103 of the order of interest in the order information table T0100 in the information holding means S270 to "4" and the payment result T0108 to "2" (FIG. 1: step a08). If the service T0604 acquired from the item information table T0600 is "0," a record is added to the contract content table T0500 held in the information holding means S270 (FIG. 1: step a08). The start date T0502 of the new record to be added stores the current time, the end date T0503 stores a value calculated based on the current time and the period T0605 acquired from the item information table T0600, the application restart date T0505 stores a value calculated based on the current time and the application restart period T0606 acquired from the item information table T0600, and the validity/invalidity T0504 stores "valid." After that, the administration means S330 instructs the order process means S230 to execute an order process (FIG. 1: step a09). Then, the window U0900 is displayed on the administrator terminal S500 (FIG. 1: step a10). The message U0901 "restart is successful" is displayed, and neither the job instruction message nor the restart button U0911 are displayed.

If the item type associated with the order of interest is other than "1" and "2," the administration means S300 instructs the order acceptability display means S320 for the administrator (FIG. 1: step a07) to display the restart result display window U0900 (FIG. 1: step a10). At this time, no restart button U9011 appears, and the message U0901 "restart is successful" is displayed, and no job instruction message U0902 is displayed. In this case, the payment result T0108 of the record corresponding to the order of interest in the order information table T0100 on the information holding means S270 is updated to "2" (FIG. 1: step a08). If the service T0604 acquired from the item information table T0600 is "0" (FIG. 18A: step F0253—YES), a record is further added to the contract content table T0500 on the information holding means S270 (FIG. 1: step a08). The start date T0502 of the record to be added stores the current time, the end date T0503 stores a value calculated based on the current time and the period T0605 acquired from the item information table T0600, the application restart date T0505 stores a value calculated based on the current time and the application restart period T0606 acquired from the item information table T0600, and the validity/invalidity T0504 stores "valid." After that, the administration means S300 instructs the order process means S230 to restart the order process (FIG. 1: step a09).

<Data Processing Method in This Embodiment: Duplication Check by Duplicate Order Checking Means>

Finally, the process of the duplicate order checking means S260 will be described below. Duplicate orders are checked on the basis of three different parameters, as will be described below. Therefore, upon reception of a duplicate order checking instruction, a passed parameter is determined first, and the following operation is made according to the type of parameter. Therefore, the application acceptance means S210 and payment information acceptance means S240 which instruct the duplicate order checking means S260 to check duplicate orders must pass a parameter to the duplicate order checking means S260 so that the duplicate order checking means S260 can identify the parameter type. To this end, a code may be appended to each parameter, and an order or fields may be fixed in a format used to pass the parameter. In any case, the duplicate order checking means S260 can determine the meaning of the passed parameter.

(Duplication Checking Based on Item Code, Item Type, and User ID)

A case will be described below wherein the duplicate order checking means S260 receives the item code, item type, and user ID. This case corresponds to a case wherein the means S260 receives a duplication checking instruction in step F0121 in FIG. 17A.

Upon reception of the item code, item type, and user ID, the duplicate order checking means S260 searches the order information table T0100 in the information holding means S270 for a record that stores the user ID and item code of interest in the user ID T0109 and item code T0102. If such record is found, and meets one of the following conditions, it is determined that an order of an identical item has already been placed (i.e., duplicate orders are detected) and a message that advises accordingly is sent to an instruction source:

(1) when the service T0604 corresponding to the item code T0102 of the record of interest is "1," and the payment result T0108 of the record of interest is "2" (the service T0604 can be acquired by searching the item information table T0600 using the item code T0102 included in the order information table T0100 as a key; in the following description, a service obtained by this search process will be simply referred to as a service of the record of interest hereinafter);

(2) when the service of the record of interest is "0," the payment result T0108 is "2," and the application restart date T0505 of the record in the contract content table T0500 corresponding to the order of interest is later than the current time; and (3) when the payment method T0106 of the record of interest is a long-term payment method, the payment result T0108 is "1," and the payment due T0107 is later than the current time.

(Duplicate Order Checking Based on Item Code and Item Type)

A case will be described below wherein the duplicate order checking means S260 receives the item code and item type. This case corresponds to a case wherein the duplication checking instruction without including any user ID is received in step F0161.

If the duplicate order checking means S260 receives the item code and item type, the order information table T0100 and orderer information table T0300 in the information holding means S270 are searched for an order which includes an equal item code T0102, and equal orderer family and first names T0302 and T0303 and mail address T0311. If such order is found, and one of the following conditions is met, it is determined that an identical orderer has placed an order of an identical item (i.e., a duplicate order). In this case, a message that advises accordingly is sent to the instruction source:

(1) when the service of the record of interest is "1" and the payment result T0108 is "2;"

(2) when the service of the record of interest is "0," the payment result T0108 is "2," and the application restart date T0505 of the record in the contract content table T0500 corresponding to the order of interest is later than the current time; and (3) when the payment method T0106 of the record of interest is a long-term payment method, the payment result T0108 is "1," and the payment due T0107 is later than the current time.

(Duplication Checking Based on Order Number)

Finally, a case will be explained below wherein an order number is received. This corresponds to a case wherein a duplication checking instruction is issued in step F0212 in FIG. 18A. The order information table T0100 in the information holding means S270 is searched for a record including this order number. If the user ID is included in the column T0109, the table T0100 is searched for records which include an equal user ID and item code, so as to check if a record including the equal user ID and item code is present. If such record is found, and one of the following conditions is met, it is determined that an identical orderer has placed an order of an identical item (i.e., a duplicate order).

(1) when the service of the record of interest is "1" and the payment result T0108 is "2;"

(2) when the service of the record of interest is "0," the payment result T0108 is "2," and the application restart date T0505 of the record in the contract content table T0500 corresponding to the order of interest is later than the current time; and (3) when the payment method T0106 of the record of interest is a long-term payment method, the payment result T0108 is "1," and the payment due T0107 is later than the current time.

If the record of the order information table T0100 which is found by search based on the received order number does not include any user ID, the order information table T0100 and orderer information table T0300 in the information holding means S270 are searched so as to check if an order which includes an equal item code T0102 in the order information table T0100 and equal orderer family and first names T0302 and T0303 and mail address T0311 in the orderer information table T0300 are present in addition to the order of interest. If such order is found, and one of the following conditions is met, a message indicating duplication is sent to the instruction source.

(1) when the service of the record of interest is "1" and the payment result T0108 is "2;"

(2) when the service of the record of interest is "0," the payment result T0108 is "2," and the application restart date T0505 of the record in the contract content table T0500 corresponding to the order of interest is later than the current time; and (3) when the payment method T0106 of the record of interest is a long-term payment method, the payment result T0108 is "1," and the payment due T0107 is later than the current time.

As described above, according to the network sales system of this embodiment, when an item or service is ordered using an environment connected to a computer network such as the Internet or the like, duplicate orders and payments can be prevented, and a payment which is completed normally can be prevented from being left unprocessed. Hence, a secure environment to orderers can be provided. Also, a cancel process and the like to the payment system are automated as much as possible, and duplicate orders of items and services which inhibit duplicate orders can be completely prevented, thus improving the efficiency of the site administrator.

Figure 19:
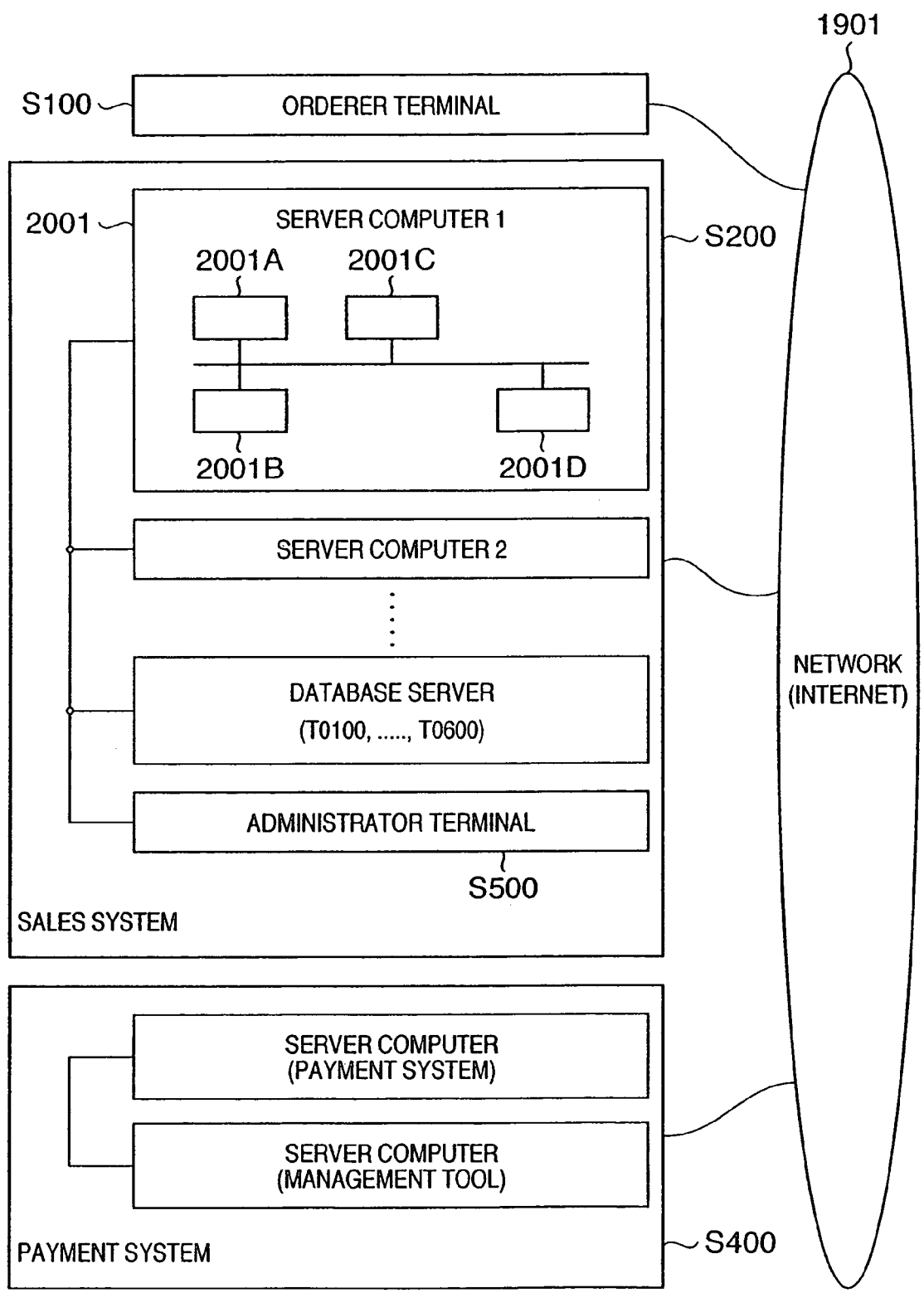
FIG. 19 is a block diagram showing an example of the hardware arrangement of the overall system.

FIG. 19 shows an example of a hardware environment which implements the system shown in FIG. 1. The orderer terminal S100, sales system S200, and payment system S400 are connected to a broad-area network 1901 such as the Internet or the like, and can communicate with each other. The orderer terminal S100 comprises a general personal computer which is installed with a WEB browser program, and includes hardware resources such as a memory and the like which allow the WEB browser program to run, and software resources such as an operating system, protocol stacks, and the like required to connect the network 1901. The general personal computer comprises a LAN interface or a network interface used to directly or indirectly connect the Internet in addition to a processor, memory, and storage (e.g., HDD).

The same applies to the administrator terminal S500. In the example of FIG. 19, the administrator terminal S500 is included in the sales system S200. Alternatively, the administrator terminal S500 may be connected to the sales system S200 via the network 1901.

The sales system S200 includes a plurality of server computers in FIG. 19. These computers implement the means included in FIG. 1 by executing programs which describe sequences to be implemented by those means. For example, the flowcharts shown in FIGS. 17A and 17B and FIGS. 18A and 18B correspond to the sequences of programs to be executed by this server computer 2001. By executing the programs by the computer, the application acceptance means S210 and payment information acceptance means S240 are implemented in the sales system S200. The sales system S200 can also be implemented by a single server computer. In such case, the programs shown in FIGS. 17A and 17B and FIGS. 18A and 18B are executed by the single computer.

The information holding means S270 is also implemented by a computer 2001 as one of server computers. The computer 2001 has a storage 2001C such as a hard disk or the like, which is used to store a database including tables shown in FIGS. 11 to 16. The computer 2001 executes a database management program which receives search, update, and add commands from other computers, and executes operations according to the commands (i.e., reads out, updates, and adds data that matches a designated condition and returns responses to command sources). The program is executed using resources such as a processor 2001A, memory 2001B, network interface 2001D, and the like.

The payment system comprises a computer which is connected to the network as in the sales system. Therefore, when the sales system S200 provides or receives information to or from the payment system, data transmission and reception are made via the network 1901. The same applies to communications between the sales system S200 and orderer terminal S100, between the payment system S410 and orderer terminal S100, and between the sales system S200 and administrator terminal S500. Note that the sales system S200 and payment system S410 may exchange information associated with a specific orderer via the orderer terminal S100 (its browser program) of that orderer. In this way, the orderer's decision confirmation operation can be easily inserted in the communication sequence.

As described above, according to the present invention, when an item or service is ordered using an environment connected to a computer network such as the Internet or the like, duplicate orders and payments can be prevented, and a payment which is completed normally can be prevented from being left unprocessed. Hence, a secure environment to orderers can be provided.

Also, a cancel process and the like to the payment system are automated as much as possible, and duplicate orders of items and services which inhibit duplicate orders can be completely prevented, thus improving the productivity of the site administrator.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code itself installed in the computer also implements the present invention. In other words, the claims of the present invention also cover a computer program for the purpose of implementing the functions of the present invention.

In this case, so long as the system or apparatus has the functions of the program, the program may be executed in any form, e.g., as object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

What is claimed is:

1. An information processing method executed by an information processing apparatus that communicates with a customer terminal, comprising:

a storage step of the information processing apparatus storing a plurality of item codes in a storage unit, each of which is associated with information indicating whether or not a duplicate order is acceptable for an item associated with the item code;

an order reception step of receiving an order, including an item code and a user ID, from the customer terminal;

a search step of searching the information indicating whether or not a duplicate order is acceptable for the associated item stored in said storage step based on the item code included in the received order;

a check step of checking whether or not the order received by said order reception unit is a duplicate based on the item code and the user ID included in the received order, wherein said check unit checks whether or not the order received by said order reception unit is a duplicate when the information searched by said search step indicates that a duplicate order is not acceptable for the associated item, and wherein the check step does not check whether or not the received order is a duplicate when the information searched by the search step indicates that a duplicate order is acceptable for the associated item;

a registration step of registering the order received by said order reception unit when the check unit performs the check and determines that the order is not a duplicate, and when the information searched by the search unit indicates that a duplicate order is acceptable for the associated item; and a notification step of notifying the customer terminal of the checking result of the check step when the checking result indicates that the order is a duplicate.

2. An information processing apparatus that communicates with a customer terminal via a network, comprising:

a storage unit configured to store a plurality of item codes, each of which is associated with information indicating whether or not a duplicate order is acceptable for an item associated with the item code;

an order reception unit configured to receive an order, including an item code and a user ID, from the customer terminal;

a search unit configured to search the information indicating whether or not a duplicate order is acceptable for the associated item stored in said storage unit based on the item code included in the received order;

a check unit configured to check whether or not the order received by said order reception unit is a duplicate based on the item code and the user ID included in the received order, wherein said check unit checks whether or not the order received by said order reception unit is a duplicate when the information searched by said search indicates that a duplicate order is not acceptable for the associated item, and wherein the check unit does not check whether or not the received order is a duplicate when the information searched by the search unit indicates that a duplicate order is acceptable for the associated item;

a registration unit configured to register the order received by said order reception unit when the check unit performs the check and determines that the order is not a duplicate, and when the information searched by the search unit indicates that a duplicate order is acceptable for the associated item; and a notification unit configured to notify the customer terminal of the checking result of said check unit when the checking result indicates that the order is a duplicate.

3. The apparatus according to claim 2, further comprising:

a calculation unit configured to calculate an order restart date/time based on an order restart period associated with an item code included in the order received by said order reception unit when said check unit determines that the order is not a duplicate; and a management unit configured to manage a past order by associating the order restart date/time with both the item code and the user ID included in the past order, wherein said storage unit stores the item code further associated with the order restart period, and wherein said check unit determines that the order is not a duplicate if the order restart date/time is prior to a current date/time.

4. An apparatus according to claim 2, wherein said registration unit registers the order received by said order reception unit in accordance with a response to the notification from the user terminal.

5. A computer readable storage medium encoded with a computer program, said computer program being executed by an information processing apparatus that communicates with a customer terminal via a network, the program comprising:

code of a storage step of the information processing apparatus storing a plurality of item codes in a storage unit, each of which is associated with information indicating whether or not a duplicate order is acceptable for an item associated with the item code;

code of an order reception unit configured to receive an order, including an item code and a user ID, from the customer terminal;

code of a search step of the information processing apparatus searching the information indicating whether or not a duplicate order is acceptable for the associated item stored in said storage step based on the item code included in the order;

code of a check step of the information processing apparatus checking whether or not the order received by said order reception unit is a duplicate based on the item code and the user ID included in the received order, wherein said check unit checks whether or not the order received by said order reception unit is a duplicate when the information searched by said search step indicates that a duplicate order is not acceptable for the associated item, and wherein the check unit does not check whether or not the received order is a duplicate when the information searched by the search step indicates that a duplicate order is acceptable for the associated item;

code of a registration step of the information processing apparatus registering the order received by said order reception unit when the check unit performs the check and determines that the order is not a duplicate, and when the information searched by the search step indicates that a duplicate order is acceptable for the associated item; and code of a notification step of notifying the customer terminal of the checking result of the checking result of the step when the checking result indicates that the order is a duplicate.

* * * * *